(12) United States Patent
Bansal et al.

(10) Patent No.: US 12,026,178 B2
(45) Date of Patent: Jul. 2, 2024

(54) OPTIMIZING THE NUMBER OF IMS DEPENDENT REGIONS

(71) Applicant: BMC Software, Inc., Houston, TX (US)

(72) Inventors: Sagar Rajendraprasad Bansal, Pune (IN); Loc Dinh Tran, McLean, VA (US); Graham Fox, Trinity, TX (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 17/657,199

(22) Filed: Mar. 30, 2022

(65) Prior Publication Data
US 2023/0132124 A1    Apr. 27, 2023

(30) Foreign Application Priority Data
Oct. 27, 2021    (IN) .............................. 202141049064

(51) Int. Cl.
*G06F 16/28*     (2019.01)
*G06F 9/50*      (2006.01)
*G06F 16/22*     (2019.01)
*G06F 16/23*     (2019.01)

(52) U.S. Cl.
CPC .......... *G06F 16/282* (2019.01); *G06F 9/5011* (2013.01); *G06F 16/2282* (2019.01); *G06F 16/2315* (2019.01)

(58) Field of Classification Search
CPC ............. G06F 2209/5022; G06F 9/505; G06F 16/217; G06F 16/2315; G06F 16/285
USPC ....................................................... 707/736
See application file for complete search history.

(56) References Cited

U.S. PATENT DOCUMENTS

2014/0196056 A1*   7/2014   Kottomtharayil ....... G06F 9/505
                                                            718/105

OTHER PUBLICATIONS

Jouko Jantti et al. ; "IMS Performance and Tuning guide", IBM.com/redbood, Dec. 2006.*

* cited by examiner

*Primary Examiner* — Hung T Vy
(74) *Attorney, Agent, or Firm* — Brake Hughes Bellermann LLP

(57) ABSTRACT

System and techniques for determining an optimal number of regions in an IMS system include receiving a transaction report from a log dataset. A first table is generated from the transaction report, where the first table includes a class identified by a class identifier (ID), a number of regions the class is assigned, and a total percent region occupancy by the class. Classes ineligible to be shut down are identified based on a set of criteria and the classes ineligible to be shut down are eliminated. For each remaining class assigned to a threshold number of regions, candidate regions from the threshold number of regions eligible for shut down are identified and remaining regions from the threshold number of regions that can handle a workload from the candidate regions eligible for shut down are identified, where the remaining regions represent the optimal number of regions in the IMS system.

21 Claims, 35 Drawing Sheets

300

| Sr no | Values for | |
|---|---|---|
| b.i | IMS region ID | 302 |
| b.ii | Region Name | 304 |
| b.iii | Transaction Name (Transaction Name/program summary record) | 306 |
| b.iv | Region Type (WFI/PWFI/Blank) | 308 |
| b.v | Class ID | 310 |
| b.vi | Program schedule count | 312 |
| b.vii | Transaction execution count | 314 |
| b.viii | Transaction accessing Db2 flag | 316 |
| b.ix | Total schedule to $1^{st}$ DLI CPU | 318 |
| b.x | Total schedule to $1^{st}$ DLI time | 320 |
| b.xi | Total transaction response time | 322 |
| | Total system elapsed time | 324 |

| 1. | Dedicated region Flag | Y/N |
|---|---|---|
| 2. | Transaction name | Tran name |
| 3. | Program name | PGM name |
| 4. | CLASS | Class ID |
| 5. | Db2 Access Flag | Y/N |
| 6. | Reassign class flag | Y/N |
| 7. | Schedule time percent of total response time | ((2.b.x Total schedule to $1^{st}$ DLI time)(2.b.xi Total transaction response time)) * 100 |
| 8. | Number of dedicated regions recommended | Value calculated in 11.c |

FIG. 4

| TRAN_NAME | PGM NAME | CLASS | Db2_Access | Class reassign... | Recommended dedicated regions | PGM SCH # | NUMBER of RGN | Total region occupancy | Schedule time percent | Total IST DLI CPU | Total IST DLI Time | Total Response Time | TRAN # | Recommended dedicated region |
|---|---|---|---|---|---|---|---|---|---|---|---|---|---|---|
| TRAN1 | PROG1 | 76 | Y | Y | 3 | 1818 | 12 | 75.57826191 | 13.97511239 | 1.647847 | 10.856573 | 77.580027 | 1850 | Y |
| TRAN2 | PROG2 | 70 | Y | N | 3 | 1500 | 4 | 86.77712201 | 5.260410444 | 1.38049 | 4.50068 | 89.0755 | 1512 | |
| TRAN3 | PROG3 | 76 | Y | Y | 2 | 904 | 10 | 25.76906773 | 19.69856191 | 0.827294 | 5.211327 | 26.451587 | 919 | |
| TRAN4 | PROG4 | 76 | Y | Y | 2 | 758 | 7 | 26.95581359 | 17.49649666 | 0.683819 | 4.769727 | 27.669765 | 769 | |
| TRAN5 | PROG5 | 43 | Y | Y | 2 | 414 | 5 | 18.78995192 | 15.79340167 | 0.395243 | 3.044596 | 19.284235 | 421 | |
| TRAN6 | PROG6 | 44 | Y | Y | 3 | 1018 | 3 | 96.74559708 | 0.403531771 | 0.271642 | 0.387219 | 99.308 | 1104 | |
| TRAN7 | PROG7 | 44 | Y | Y | 2 | 231 | 3 | 6.04805332 | 11.16745984 | 0.231126 | 0.690284 | 6.208242 | 244 | |
| TRAN8 | PROG8 | 90 | N | Y | 2 | 864 | 9 | 1.957455844 | 13.00000374 | 0.22814 | 0.260056 | 2.009301 | 883 | |
| TRAN9 | PROG9 | 102 | N | Y | 2 | 211 | 1 | 1.802775701 | 15.51927994 | 0.119323 | 0.287188 | 1.850524 | 212 | |
| TRAN10 | PROG10 | 3 | N | Y | 2 | 518 | 3 | 15.82093078 | 1.906703949 | 0.111973 | 0.154395 | 15.932018 | 523 | |
| TRAN11 | PROG11 | 4 | Y | Y | 2 | 391 | 3 | 8.515603803 | 6.848672274 | 0.111583 | 0.572803 | 8.741148 | 395 | |
| TRAN12 | PROG12 | 17 | Y | Y | 2 | 393 | 2 | 5.648387856 | 4.816132963 | 0.105724 | 0.277591 | 5.797991 | 396 | |
| TRAN13 | PROG13 | 3 | Y | Y | 2 | 413 | 1 | 7.116910578 | 1.333860979 | 0.082887 | 0.097444 | 7.305409 | 415 | |
| TRAN14 | PROG14 | 32 | N | Y | 2 | 408 | 1 | 3.598777807 | 2.859563709 | 0.080832 | 0.105635 | 3.694095 | 409 | |
| TRAN15 | PROG15 | 102 | N | N | 2 | 126 | 1 | 0.572696565 | 24.03885246 | 0.070328 | 0.141316 | 0.587865 | 127 | |
| TRAN16 | PROG16 | 28 | Y | Y | 2 | 188 | 1 | 1.538215831 | 4.866376982 | 0.042435 | 0.076838 | 1.578957 | 189 | |
| TRAN17 | PROG17 | 90 | N | Y | 2 | 140 | 1 | 0.226425886 | 19.74546409 | 0.041392 | 0.045893 | 0.232423 | 142 | |

Assign below high frequency reentrant transactions to dedicated class and define it to be running as WFI or schedule the class to MPR running as PWFI Reassignment id:1

Transaction XXXXXXXX running under class XY spends 13.975 of response time in scheduling the transaction.

This transaction needs to be defined as WFI on TRANSACT macro and regened. It can be reassigned to class AB and we can have 3 MPR's running dedicatedly for this class having average region occupancy of 26%

This transaction access Db2 and is very strongly recommended to be run as WFI. Above reassignment could reduce average response time of transaction XXXXXXXX approximately by 10% and CPU reduction by ZZ units.

FIG. 6

First Table (Table 1) 800

| Class Id | Count of unique transactions assigned to the class | Sum of transaction execution count for this class | Sum of total response time in seconds |
|---|---|---|---|
| Class 1 | 8 | 750,045 | 185.40 |
| Class 3 | 2 | 1,500,874 | 125.58 |
| Class 7 | 10 | 500,000 | 100.12 |
| Class 10 | 15 | 100,000 | 75.50 |
| Class 12 | 1 | 1,200,000 | 100.52 |

FIG. 8

Second Table
(Table 2) 900

| Class Id | Transaction name | Total transaction execution count for each transaction name | Total response time | Total transaction schedule count | P-WFI flag |
|---|---|---|---|---|---|
| Class 1 | Tran 1 | 200,000 | 52.00 | 185,215 | - |
| Class 1 | Tran 5 | 212,000 | 50.00 | 175,000 | - |
| Class 1 | Tran 12 | 115,000 | 20.00 | 112,000 | - |
| Class 1 | Tran 20 | 100,000 | 15.25 | 98,000 | - |
| Class 1 | Tran 30 | 45,000 | 15.15 | 45,000 | - |
| Class 1 | Tran 10 | 20,000 | 14.00 | 20,000 | - |
| Class 1 | Tran 15 | 49,000 | 12.00 | 45,000 | - |
| Class 1 | Tran 50 | 9.045 | 7.00 | 90,045 | - |

FIG. 9

Updated Second Table (Updated Table 2) 1000

| Class Id | Transaction name | Total transaction execution count for each transaction name | Total response time | Total transaction schedule count | P-WFI flag |
|---|---|---|---|---|---|
| Class 1 | Tran 1 | 200,000 | 52.00 | 185,215 | Y |
| Class 1 | Tran 5 | 212,000 | 50.00 | 175,000 | Y |
| Class 1 | Tran 12 | 115,000 | 20.00 | 112,000 | Y |

FIG. 10

Table 1

| Class ID | Count of regions (MPRs) the class is assigned (#) | Total region occupancy (%) |
|---|---|---|
| 218 | 20 | 97.35 |
| 50 | 5 | 55.74 |
| 65 | 19 | 49.54 |
| 4 | 13 | 31.56 |
| 66 | 7 | 24.17 |
| 210 | 4 | 17.74 |
| 212 | 4 | 10.37 |
| 211 | 3 | 8.89 |
| 213 | 3 | 7.67 |
| 44 | 5 | 6.14 |
| 104 | 5 | 5.46 |
| 216 | 4 | 4.07 |
| 215 | 2 | 0.70 |
| 200 | 4 | 0.03 |
| 202 | 2 | 0.00 |

FIG. 12

Table 2

| Class ID | Region ID | Region occupancy of class for this region |
|---|---|---|
| 4 | 1 | 2.49 |
| 4 | 16 | 2.60 |
| 4 | 25 | 2.70 |
| 4 | 26 | 2.67 |
| 4 | 39 | 2.43 |
| 4 | 45 | 2.43 |
| 4 | 54 | 2.36 |
| 4 | 68 | 2.03 |
| 4 | 77 | 2.63 |
| 4 | 79 | 2.63 |
| 4 | 89 | 2.79 |
| 4 | 96 | 2.65 |
| 4 | 206 | 2.07 |
| 44 | 114 | 1.32 |
| 44 | 143 | 1.28 |
| 44 | 148 | 1.31 |
| 44 | 163 | 1.11 |
| 44 | 168 | 1.28 |
| 50 | 11 | 11.32 |
| 50 | 46 | 11.14 |
| 50 | 99 | 11.31 |
| 50 | 207 | 12.23 |
| 50 | 208 | 11.20 |
| 65 | 13 | 3.75 |
| 65 | 36 | 3.28 |
| 65 | 67 | 1.01 |
| 65 | 101 | 3.42 |
| 65 | 113 | 3.28 |
| 65 | 124 | 3.66 |
| 65 | 126 | 3.65 |
| 65 | 142 | 3.31 |

FIG. 13A

Table 2 Continued

| 1302 | 1304 | 1306 |
|---|---|---|
| 65 | 150 | 1.71 |
| 65 | 174 | 2.73 |
| 65 | 178 | 3.42 |
| 65 | 183 | 3.02 |
| 65 | 191 | 3.44 |
| 65 | 199 | 3.32 |
| 65 | 212 | 3.65 |
| 65 | 225 | 1.66 |
| 65 | 233 | 1.00 |
| 65 | 239 | 1.13 |
| 65 | 246 | 0.41 |
| 66 | 67 | 2.39 |
| 66 | 150 | 2.97 |
| 66 | 174 | 1.47 |
| 66 | 225 | 3.81 |
| 66 | 233 | 4.74 |
| 66 | 239 | 3.02 |
| 66 | 246 | 6.37 |
| 104 | 3 | 1.12 |
| 104 | 22 | 1.11 |
| 104 | 28 | 1.14 |
| 104 | 42 | 1.13 |
| 104 | 47 | 1.11 |
| 200 | 100 | 0.01 |
| 200 | 106 | 0.01 |
| 200 | 108 | 0.01 |
| 200 | 240 | 0.01 |
| 202 | 222 | 0.00 |
| 202 | 230 | 0.00 |
| 210 | 20 | 5.72 |
| 210 | 35 | 4.43 |
| 210 | 70 | 5.61 |
| 210 | 220 | 2.44 |
| 211 | 59 | 3.47 |
| 211 | 84 | 2.69 |
| 211 | 104 | 2.97 |
| 212 | 8 | 2.81 |
| 212 | 74 | 3.26 |
| 212 | 95 | 0.74 |
| 212 | 252 | 3.84 |
| 213 | 32 | 3.04 |
| 213 | 44 | 2.70 |
| 213 | 93 | 2.13 |
| 215 | 27 | 0.38 |
| 215 | 40 | 0.34 |
| 216 | 107 | 1.06 |

FIG. 13B

Table 2 Continued  1302  1304  1306

1300

| | | |
|---|---|---|
| 216 | 218 | 1.38 |
| 216 | 223 | 1.61 |
| 216 | 227 | 0.13 |
| 218 | 15 | 5.29 |
| 218 | 37 | 4.85 |
| 218 | 41 | 510 |
| 218 | 43 | 4.44 |
| 218 | 62 | 5.15 |
| 218 | 75 | 4.50 |
| 218 | 83 | 4.98 |
| 218 | 85 | 4.77 |
| 218 | 88 | 5.19 |
| 218 | 103 | 4.87 |
| 218 | 109 | 5.12 |
| 218 | 110 | 4.90 |
| 218 | 138 | 4.67 |
| 218 | 139 | 4.81 |
| 218 | 158 | 5.11 |
| 218 | 158 | 4.99 |
| 218 | 171 | 5.09 |
| 218 | 184 | 5.26 |
| 218 | 186 | 5.10 |
| 218 | 202 | 5.71 |

FIG. 13C

Table 3

| Region ID | Class#1 | Class#2 | Class#3 | Class#4 | Region Occupancy | Shutdown MPR Flag | Count of classes assigned |
|---|---|---|---|---|---|---|---|
| 1 | 4 | N | N | N | 2.49 | N | 1 |
| 3 | 104 | N | N | N | 1.12 | N | 1 |
| 8 | 212 | N | N | N | 2.81 | N | 1 |
| 11 | 50 | N | N | N | 11.32 | N | 1 |
| 13 | 65 | N | N | N | 3.75 | N | 1 |
| 15 | 218 | N | N | N | 5.29 | N | 1 |
| 16 | 4 | N | N | N | 2.60 | N | 1 |
| 20 | 210 | N | N | N | 5.72 | N | 1 |
| 22 | 104 | N | N | N | 1.11 | N | 1 |
| 25 | 4 | N | N | N | 2.70 | N | 1 |
| 26 | 4 | N | N | N | 2.67 | N | 1 |
| 27 | 215 | N | N | N | 0.38 | N | 1 |
| 28 | 104 | N | N | N | 1.14 | N | 1 |
| 32 | 213 | N | N | N | 3.04 | N | 1 |
| 35 | 210 | N | N | N | 4.43 | N | 1 |
| 36 | 65 | N | N | N | 3.28 | N | 1 |
| 37 | 218 | N | N | N | 4.85 | N | 1 |
| 39 | 4 | N | N | N | 2.43 | N | 1 |
| 40 | 215 | N | N | N | 0.34 | N | 1 |
| 41 | 218 | N | N | N | 5.10 | N | 1 |
| 42 | 104 | N | N | N | 1.13 | N | 1 |
| 43 | 218 | N | N | N | 4.44 | N | 1 |
| 44 | 213 | N | N | N | 2.70 | N | 1 |
| 45 | 4 | N | N | N | 2.43 | N | 1 |
| 46 | 50 | N | N | N | 11.14 | N | 1 |
| 47 | 104 | N | N | N | 1.11 | N | 1 |
| 54 | 4 | N | N | N | 2.36 | N | 1 |
| 59 | 211 | N | N | N | 3.47 | N | 1 |
| 62 | 218 | N | N | N | 5.15 | N | 1 |
| 67 | 65 | 66 | N | N | 3.41 | N | 2 |
| 68 | 4 | N | N | N | 2.03 | N | 1 |
| 70 | 210 | N | N | N | 5.61 | N | 1 |
| 74 | 212 | N | N | N | 3.26 | N | 1 |
| 75 | 218 | N | N | N | 4.50 | N | 1 |
| 77 | 4 | N | N | N | 2.63 | N | 1 |
| 79 | 4 | N | N | N | 2.63 | N | 1 |
| 83 | 218 | N | N | N | 4.98 | N | 1 |
| 84 | 211 | N | N | N | 2.69 | N | 1 |
| 85 | 218 | N | N | N | 4.77 | N | 1 |
| 88 | 218 | N | N | N | 5.19 | N | 1 |

FIG. 14A

Table 3 Continued                                                          1400

| 1402 | 1404 | 1406 | 1408 | 1410 | 1412 | 1414 | 1416 |
|---|---|---|---|---|---|---|---|
| 89 | 4 | N | N | N | 2.72 | N | 1 |
| 93 | 213 | N | N | N | 2.13 | N | 1 |
| 95 | 212 | N | N | N | 0.74 | N | 1 |
| 96 | 4 | N | N | N | 2.65 | N | 1 |
| 99 | 50 | N | N | N | 11.31 | N | 1 |
| 100 | 200 | N | N | N | 0.01 | N | 1 |
| 101 | 65 | N | N | N | 3.42 | N | 1 |
| 103 | 218 | N | N | N | 4.87 | N | 1 |
| 104 | 211 | N | N | N | 2.97 | N | 1 |
| 106 | 200 | N | N | N | 0.01 | N | 1 |
| 107 | 216 | N | N | N | 1.06 | N | 1 |
| 108 | 200 | N | N | N | 0.01 | N | 1 |
| 109 | 218 | N | N | N | 5.12 | N | 1 |
| 110 | 218 | N | N | N | 4.90 | N | 1 |
| 113 | 65 | N | N | N | 3.28 | N | 1 |
| 114 | 44 | N | N | N | 1.32 | N | 1 |
| 124 | 65 | N | N | N | 3.66 | N | 1 |
| 126 | 65 | N | N | N | 3.65 | N | 1 |
| 138 | 218 | N | N | N | 4.67 | N | 1 |
| 139 | 218 | N | N | N | 4.81 | N | 1 |
| 142 | 65 | N | N | N | 3.31 | N | 1 |
| 143 | 44 | N | N | N | 1.28 | N | 1 |
| 148 | 44 | N | N | N | 1.31 | N | 1 |
| 150 | 65 | 66 | N | N | 4.68 | N | 2 |
| 153 | 218 | N | N | N | 5.11 | N | 1 |
| 156 | 218 | N | N | N | 4.99 | N | 1 |
| 163 | 44 | N | N | N | 1.11 | N | 1 |
| 168 | 44 | N | N | N | 1.28 | N | 1 |
| 171 | 218 | N | N | N | 5.09 | N | 1 |
| 174 | 65 | 66 | N | N | 4.20 | N | 2 |
| 178 | 65 | N | N | N | 3.42 | N | 1 |
| 183 | 65 | N | N | N | 3.02 | N | 1 |
| 184 | 218 | N | N | N | 5.26 | N | 1 |
| 186 | 218 | N | N | N | 5.10 | N | 1 |
| 191 | 65 | N | N | N | 3.44 | N | 1 |
| 199 | 65 | N | N | N | 3.32 | N | 1 |
| 202 | 218 | N | N | N | 5.71 | N | 1 |
| 206 | 4 | N | N | N | 2.07 | N | 1 |
| 207 | 50 | N | N | N | 12.23 | N | 1 |
| 208 | 50 | N | N | N | 11.20 | N | 1 |
| 212 | 65 | N | N | N | 3.65 | N | 1 |
| 218 | 216 | N | N | N | 1.38 | N | 1 |
| 220 | 210 | N | N | N | 2.44 | N | 1 |
| 222 | 202 | N | N | N | 0.00 | N | 1 |
| 223 | 216 | N | N | N | 1.61 | N | 1 |
| 225 | 65 | 66 | N | N | 5.46 | N | 2 |

FIG. 14B

Table 3 Continued

| 1402 | 1404 | 1406 | 1408 | 1410 | 1412 | 1414 | 1416 |
|------|------|------|------|------|------|------|------|
| 227 | 216 | N | N | N | 0.13 | N | 1 |
| 230 | 202 | N | N | N | 0.00 | N | 1 |
| 233 | 65 | 66 | N | N | 5.78 | N | 2 |
| 239 | 65 | 66 | N | N | 4.15 | N | 2 |
| 240 | 200 | N | N | N | 0.01 | N | 1 |
| 246 | 65 | 66 | N | N | 6.77 | N | 2 |
| 252 | 212 | N | N | N | 3.84 | N | 1 |

FIG. 14C

Updated Table 3

1400a

| Region ID | Class#1 | Class#2 | Class#3 | Class#4 | Region Occupancy | Shutdown MPR Flag | Count of classes assigned |
|---|---|---|---|---|---|---|---|
| 1 | 4 | N | N | N | 2.49 | Y | 1 |
| 3 | 104 | N | N | N | 1.12 | Y | 1 |
| 8 | 212 | N | N | N | 2.81 | Y | 1 |
| 11 | 50 | N | N | N | 11.32 | Y | 1 |
| 13 | 65 | N | N | N | 3.75 | Y | 1 |
| 15 | 218 | N | N | N | 5.29 | Y | 1 |
| 16 | 4 | N | N | N | 2.6 | Y | 1 |
| 20 | 210 | N | N | N | 5.72 | Y | 1 |
| 22 | 104 | N | N | N | 1.11 | Y | 1 |
| 25 | 4 | N | N | N | 2.7 | Y | 1 |
| 26 | 4 | N | N | N | 2.67 | Y | 1 |
| 27 | 215 | N | N | N | 0.38 | N | 1 |
| 28 | 104 | N | N | N | 1.14 | Y | 1 |
| 32 | 213 | N | N | N | 3.04 | N | 1 |
| 35 | 210 | N | N | N | 4.43 | Y | 1 |

Column labels: 1402, 1404, 1406, 1408, 1410, 1412, 1414, 1416

FIG. 15A

Updated Table 3 Continued

| 1402 | 1404 | 1406 | 1408 | 1410 | 1412 | 1414 | 1416 |
|---|---|---|---|---|---|---|---|
| 36 | 65 | N | N | N | 3.28 | Y | 1 |
| 37 | 218 | N | N | N | 4.85 | Y | 1 |
| 39 | 4 | N | N | N | 2.43 | Y | 1 |
| 40 | 215 | N | N | N | 0.34 | N | 1 |
| 41 | 218 | N | N | N | 5.1 | Y | 1 |
| 42 | 104 | N | N | N | 1.13 | Y | 1 |
| 43 | 218 | N | N | N | 4.44 | Y | 1 |
| 44 | 213 | N | N | N | 2.7 | N | 1 |
| 45 | 4 | N | N | N | 2.43 | Y | 1 |
| 46 | 50 | N | N | N | 11.14 | Y | 1 |
| 47 | 104 | N | N | N | 1.11 | Y | 1 |
| 54 | 4 | N | N | N | 2.36 | Y | 1 |
| 59 | 211 | N | N | N | 3.47 | N | 1 |
| 62 | 218 | N | N | N | 5.15 | Y | 1 |
| 67 | 65 | 66 | N | N | 3.41 | Y | 2 |
| 68 | 4 | N | N | N | 2.03 | Y | 1 |
| 70 | 210 | N | N | N | 5.61 | Y | 1 |
| 74 | 212 | N | N | N | 3.26 | Y | 1 |
| 75 | 218 | N | N | N | 4.5 | Y | 1 |
| 77 | 4 | N | N | N | 2.63 | Y | 1 |
| 79 | 4 | N | N | N | 2.63 | Y | 1 |
| 83 | 218 | N | N | N | 4.98 | Y | 1 |
| 84 | 211 | N | N | N | 2.69 | N | 1 |
| 85 | 218 | N | N | N | 4.77 | Y | 1 |
| 88 | 218 | N | N | N | 5.19 | Y | 1 |
| 89 | 4 | N | N | N | 2.72 | Y | 1 |
| 93 | 213 | N | N | N | 2.13 | N | 1 |
| 95 | 212 | N | N | N | 0.74 | Y | 1 |
| 96 | 4 | N | N | N | 2.65 | Y | 1 |
| 99 | 50 | N | N | N | 11.31 | Y | 1 |
| 100 | 200 | N | N | N | 0.01 | Y | 1 |
| 101 | 65 | N | N | N | 3.42 | Y | 1 |
| 103 | 218 | N | N | N | 4.87 | Y | 1 |
| 104 | 211 | N | N | N | 2.97 | N | 1 |
| 106 | 200 | N | N | N | 0.01 | Y | 1 |
| 107 | 216 | N | N | N | 1.06 | Y | 1 |
| 108 | 200 | N | N | N | 0.01 | Y | 1 |
| 109 | 218 | N | N | N | 5.12 | Y | 1 |
| 110 | 218 | N | N | N | 4.9 | Y | 1 |
| 113 | 65 | N | N | N | 3.28 | Y | 1 |
| 114 | 44 | N | N | N | 1.32 | Y | 1 |
| 124 | 65 | N | N | N | 3.66 | Y | 1 |
| 126 | 65 | N | N | N | 3.65 | Y | 1 |
| 138 | 218 | N | N | N | 4.67 | Y | 1 |
| 139 | 218 | N | N | N | 4.81 | Y | 1 |
| 142 | 65 | N | N | N | 3.31 | Y | 1 |

FIG. 15B

Updated Table 3 Continued

| 1402 | 1404 | 1406 | 1408 | 1410 | 1412 | 1414 | 1416 |
|---|---|---|---|---|---|---|---|
| 143 | 44 | N | N | N | 1.28 | Y | 1 |
| 148 | 44 | N | N | N | 1.31 | Y | 1 |
| 150 | 65 | 66 | N | N | 4.68 | Y | 2 |
| 153 | 218 | N | N | N | 5.11 | Y | 1 |
| 156 | 218 | N | N | N | 4.99 | Y | 1 |
| 163 | 44 | N | N | N | 1.11 | Y | 1 |
| 168 | 44 | N | N | N | 1.28 | Y | 1 |
| 171 | 218 | N | N | N | 5.09 | Y | 1 |
| 174 | 65 | 66 | N | N | 4.2 | Y | 2 |
| 178 | 65 | N | N | N | 3.42 | Y | 1 |
| 183 | 65 | N | N | N | 3.02 | Y | 1 |
| 184 | 218 | N | N | N | 5.26 | Y | 1 |
| 186 | 218 | N | N | N | 5.1 | Y | 1 |
| 191 | 65 | N | N | N | 3.44 | Y | 1 |
| 199 | 65 | N | N | N | 3.32 | Y | 1 |
| 202 | 218 | N | N | N | 5.71 | Y | 1 |
| 206 | 4 | N | N | N | 2.07 | Y | 1 |
| 207 | 50 | N | N | N | 12.23 | Y | 1 |
| 208 | 50 | N | N | N | 11.2 | Y | 1 |
| 212 | 65 | N | N | N | 3.65 | Y | 1 |
| 218 | 216 | N | N | N | 1.38 | Y | 1 |
| 220 | 210 | N | N | N | 2.44 | Y | 1 |
| 222 | 202 | N | N | N | 0 | N | 1 |
| 223 | 216 | N | N | N | 1.61 | Y | 1 |
| 225 | 65 | 66 | N | N | 5.46 | Y | 2 |
| 227 | 216 | N | N | N | 0.13 | Y | 1 |
| 230 | 202 | N | N | N | 0 | N | 1 |
| 233 | 65 | 66 | N | N | 5.78 | Y | 2 |
| 239 | 65 | 66 | N | N | 4.15 | Y | 2 |
| 240 | 200 | N | N | N | 0.01 | Y | 1 |
| 246 | 65 | 66 | N | N | 6.77 | Y | 2 |
| 252 | 212 | N | N | N | 3.84 | Y | 1 |

Snippet of Table 2        1600

| Class Id | Region ID | Region occupancy of class for this region |
|---|---|---|
| 65 | 13 | 3.75 |
| 65 | 36 | 3.28 |
| 65 | 67 | 1.01 |
| 65 | 101 | 3.42 |
| 65 | 113 | 3.28 |
| 65 | 124 | 3.66 |
| 65 | 126 | 3.65 |
| 65 | 142 | 3.31 |
| 65 | 150 | 1.71 |
| 65 | 174 | 2.73 |
| 65 | 178 | 3.42 |
| 65 | 183 | 3.02 |
| 65 | 191 | 3.44 |
| 65 | 199 | 3.32 |
| 65 | 212 | 3.65 |
| 65 | 225 | 1.66 |
| 65 | 233 | 1.00 |
| 65 | 239 | 1.13 |
| 65 | 246 | 0.41 |
| 66 | 67 | 2.39 |
| 66 | 150 | 2.97 |
| 66 | 174 | 1.47 |
| 66 | 225 | 3.81 |
| 66 | 233 | 4.78 |
| 66 | 239 | 3.02 |
| 66 | 246 | 6.37 |

Updated Snippet of Table 2

| Class Id | Region ID | Region occupancy of class for this region |
|---|---|---|
| 65 | 13 | ~~3.75~~ 4.76 |
| 65 | 36 | 3.28 |
| 65 | 67 | ~~1.01~~ 0.0 |
| 65 | 101 | 3.42 |
| 65 | 113 | 3.28 |
| 65 | 124 | 3.66 |
| 65 | 126 | 3.65 |
| 65 | 142 | 3.31 |
| 65 | 150 | 1.71 |
| 65 | 174 | 2.73 |
| 65 | 178 | 3.42 |
| 65 | 183 | 3.02 |
| 65 | 191 | 3.44 |
| 65 | 199 | 3.32 |
| 65 | 212 | 3.65 |
| 65 | 225 | 1.66 |
| 65 | 233 | 1.00 |
| 65 | 239 | 1.13 |
| 65 | 246 | 0.41 |
| 66 | 67 | ~~2.39~~ 0.0 |
| 66 | 150 | ~~2.97~~ 5.36 |
| 66 | 174 | 1.47 |
| 66 | 225 | 3.81 |
| 66 | 233 | 4.78 |
| 66 | 239 | 3.02 |
| 66 | 246 | 6.37 |

FIG. 17

Updated Table 3

| Region ID | Class#1 | Class#2 | Class#3 | Class#4 | Region Occupancy | Shutdown MPR Flag | Count of classes assigned |
|---|---|---|---|---|---|---|---|
| 1 | 4 | N | N | N | 2.49 | Y | 1 |
| 3 | 104 | N | N | N | 1.12 | Y | 1 |
| 8 | 212 | N | N | N | 2.81 | Y | 1 |
| 11 | 50 | N | N | N | 11.32 | Y | 1 |
| 13 | 65 | N | N | N | ~~3.75~~ 4.76 | Y | 1 |
| 15 | 218 | N | N | N | 5.29 | Y | 1 |
| 16 | 4 | N | N | N | 2.6 | Y | 1 |
| 20 | 210 | N | N | N | 5.72 | Y | 1 |
| 22 | 104 | N | N | N | 1.11 | Y | 1 |
| 25 | 4 | N | N | N | 2.7 | Y | 1 |
| 26 | 4 | N | N | N | 2.67 | Y | 1 |
| 27 | 215 | N | N | N | 0.38 | N | 1 |
| 28 | 104 | N | N | N | 1.14 | Y | 1 |
| 32 | 213 | N | N | N | 3.04 | N | 1 |
| 35 | 210 | N | N | N | 4.43 | Y | 1 |
| 36 | 65 | N | N | N | 3.28 | Y | 1 |
| 37 | 218 | N | N | N | 4.85 | Y | 1 |
| 39 | 4 | N | N | N | 2.43 | Y | 1 |
| 40 | 215 | N | N | N | 0.34 | N | 1 |
| 41 | 218 | N | N | N | 5.1 | Y | 1 |
| 42 | 104 | N | N | N | 1.13 | Y | 1 |
| 43 | 218 | N | N | N | 4.44 | Y | 1 |
| 44 | 213 | N | N | N | 2.7 | N | 1 |
| 45 | 4 | N | N | N | 2.43 | Y | 1 |
| 46 | 50 | N | N | N | 11.14 | Y | 1 |
| 47 | 104 | N | N | N | 1.11 | Y | 1 |
| 54 | 4 | N | N | N | 2.36 | Y | 1 |
| 59 | 211 | N | N | N | 3.47 | N | 1 |
| 62 | 218 | N | N | N | 5.15 | Y | 1 |
| 67 | 65 | 66 | N | N | 3.41 | Y | 2 |
| 68 | 4 | N | N | N | 2.03 | Y | 1 |
| 70 | 210 | N | N | N | 5.61 | Y | 1 |
| 74 | 212 | N | N | N | 3.26 | Y | 1 |
| 75 | 218 | N | N | N | 4.5 | Y | 1 |
| 77 | 4 | N | N | N | 2.63 | Y | 1 |
| 79 | 4 | N | N | N | 2.63 | Y | 1 |

FIG. 18A

Updated Table 3 Cont.

| 1402 | 1404 | 1406 | 1408 | 1410 | 1412 | 1414 | 1416 |
|---|---|---|---|---|---|---|---|
| 83 | 218 | N | N | N | 4.98 | Y | 1 |
| 84 | 211 | N | N | N | 2.69 | N | 1 |
| 85 | 218 | N | N | N | 4.77 | Y | 1 |
| 88 | 218 | N | N | N | 5.19 | Y | 1 |
| 89 | 4 | N | N | N | 2.72 | Y | 1 |
| 93 | 213 | N | N | N | 2.13 | N | 1 |
| 95 | 212 | N | N | N | 0.74 | Y | 1 |
| 96 | 4 | N | N | N | 2.65 | Y | 1 |
| 99 | 50 | N | N | N | 11.31 | Y | 1 |
| 100 | 200 | N | N | N | 0.01 | Y | 1 |
| 101 | 65 | N | N | N | 3.42 | Y | 1 |
| 103 | 218 | N | N | N | 4.87 | Y | 1 |
| 104 | 211 | N | N | N | 2.97 | N | 1 |
| 106 | 200 | N | N | N | 0.01 | Y | 1 |
| 107 | 216 | N | N | N | 1.06 | Y | 1 |
| 108 | 200 | N | N | N | 0.01 | Y | 1 |
| 109 | 218 | N | N | N | 5.12 | Y | 1 |
| 110 | 218 | N | N | N | 4.9 | Y | 1 |
| 113 | 65 | N | N | N | 3.28 | Y | 1 |
| 114 | 44 | N | N | N | 1.32 | Y | 1 |
| 124 | 65 | N | N | N | 3.66 | Y | 1 |
| 126 | 65 | N | N | N | 3.65 | Y | 1 |
| 138 | 218 | N | N | N | 4.67 | Y | 1 |
| 139 | 218 | N | N | N | 4.81 | Y | 1 |
| 142 | 65 | N | N | N | 3.31 | Y | 1 |
| 143 | 44 | N | N | N | 1.28 | Y | 1 |
| 148 | 44 | N | N | N | 1.31 | Y | 1 |
| 150 | 65 | 66 | N | N | ~~4.68~~ 7.07 | Y | 2 |
| 153 | 218 | N | N | N | 5.11 | Y | 1 |
| 156 | 218 | N | N | N | 4.99 | Y | 1 |
| 163 | 44 | N | N | N | 1.11 | Y | 1 |
| 168 | 44 | N | N | N | 1.28 | Y | 1 |
| 171 | 218 | N | N | N | 5.09 | Y | 1 |
| 174 | 65 | 66 | N | N | 4.2 | Y | 2 |
| 178 | 65 | N | N | N | 3.42 | Y | 1 |
| 183 | 65 | N | N | N | 3.02 | Y | 1 |
| 184 | 218 | N | N | N | 5.26 | Y | 1 |
| 186 | 218 | N | N | N | 5.1 | Y | 1 |
| 191 | 65 | N | N | N | 3.44 | Y | 1 |
| 199 | 65 | N | N | N | 3.32 | Y | 1 |
| 202 | 218 | N | N | N | 5.71 | Y | 1 |
| 206 | 4 | N | N | N | 2.07 | Y | 1 |
| 207 | 50 | N | N | N | 12.23 | Y | 1 |
| 208 | 50 | N | N | N | 11.2 | Y | 1 |
| 212 | 65 | N | N | N | 3.65 | Y | 1 |
| 218 | 216 | N | N | N | 1.38 | Y | 1 |

FIG. 18B

Updated Table 1

1900

| Class Id | Count of regions (MPRs) the class is assigned (#) | Total region occupancy (%) |
|---|---|---|
| 218 | 20 | 97.35 |
| 50 | 5 | 55.74 |
| 65 | ~~10~~18 | 49.54 |
| 4 | 13 | 31.56 |
| 66 | ~~7~~6 | 24.17 |
| 210 | 4 | 17.74 |
| 212 | 4 | 10.37 |
| 211 | 3 | 8.89 |
| 213 | 3 | 7.67 |
| 44 | 5 | 6.14 |
| 104 | 5 | 5.46 |
| 216 | 4 | 4.07 |
| 215 | 2 | 0.70 |
| 200 | 4 | 0.03 |
| 202 | 2 | 0.00 |

FIG. 19

Final Table 2  1302     1304       1306    2100

| Class Id | Region ID | Region occupancy of class for this region |
|---|---|---|
| 4 | 25 | 10.52 |
| 4 | 26 | 10.52 |
| 4 | 89 | 10.52 |
| 44 | 114 | 2.04 |
| 44 | 148 | 2.04 |
| 44 | 168 | 2.04 |
| 50 | 11 | 18.58 |
| 50 | 99 | 18.58 |
| 50 | 207 | 18.58 |
| 65 | 225 | 16.51 |
| 65 | 233 | 16.51 |
| 65 | 246 | 16.51 |
| 66 | 225 | 8.06 |
| 66 | 233 | 8.06 |
| 66 | 246 | 8.06 |
| 104 | 3 | 3.19 |
| 104 | 28 | 1.14 |
| 104 | 42 | 1.13 |
| 200 | 100 | 0.01 |
| 200 | 106 | 0.01 |
| 200 | 108 | 0.01 |
| 210 | 20 | 7.70 |
| 210 | 35 | 4.43 |
| 210 | 70 | 5.61 |
| 212 | 8 | 3.28 |
| 212 | 74 | 3.26 |
| 212 | 252 | 3.84 |
| 216 | 107 | 1.08 |
| 216 | 218 | 1.38 |
| 216 | 223 | 1.61 |
| 218 | 15 | 32.46 |
| 218 | 184 | 32.46 |
| 218 | 202 | 32.46 |

FIG. 21

Final Table 3

2200

| Region ID | Class#1 | Class#2 | Class#3 | Class#4 | Region Occupancy | Shutdown MPR Flag | Count of classes assigned |
|---|---|---|---|---|---|---|---|
| 1 | 4 | N | N | N | 55 | Y | 1 |
| 25 | 4 | N | N | N | 10.52 | N | 1 |
| 26 | 4 | N | N | N | 10.52 | N | 1 |
| 89 | 4 | N | N | N | 10.52 | N | 1 |
| 16 | 4 | N | N | N | 55 | Y | 1 |
| 39 | 4 | N | N | N | 55 | Y | 1 |
| 45 | 4 | N | N | N | 55 | Y | 1 |
| 54 | 4 | N | N | N | 55 | Y | 1 |
| 68 | 4 | N | N | N | 55 | Y | 1 |
| 77 | 4 | N | N | N | 55 | Y | 1 |
| 79 | 4 | N | N | N | 55 | Y | 1 |
| 96 | 4 | N | N | N | 55 | Y | 1 |
| 206 | 4 | N | N | N | 55 | Y | 1 |
| 114 | 44 | N | N | N | 2.04 | N | 1 |
| 148 | 44 | N | N | N | 2.04 | N | 1 |
| 168 | 44 | N | N | N | 2.04 | N | 1 |
| 143 | 44 | N | N | N | 55 | Y | 1 |
| 163 | 44 | N | N | N | 55 | Y | 1 |

FIG. 22A

Final Table 3 Cont.

| 1402 | 1404 | 1406 | 1408 | 1410 | 1412 | 1414 | 1416 2200 |
|---|---|---|---|---|---|---|---|
| 11 | 50 | N | N | N | 18.58 | N | 1 |
| 99 | 50 | N | N | N | 18.58 | N | 1 |
| 207 | 50 | N | N | N | 18.58 | N | 1 |
| 46 | 50 | N | N | N | 55 | Y | 1 |
| 208 | 50 | N | N | N | 55 | Y | 1 |
| 13 | 65 | N | N | N | 55 | Y | 1 |
| 36 | 65 | N | N | N | 55 | Y | 1 |
| 225 | 65 | 66 | N | N | 24.57 | N | 2 |
| 67 | 65 | 66 | N | N | 55 | Y | 2 |
| 233 | 65 | 66 | N | N | 24.57 | N | 2 |
| 246 | 65 | 66 | N | N | 24.57 | N | 2 |
| 101 | 65 | N | N | N | 55 | Y | 1 |
| 113 | 65 | N | N | N | 55 | Y | 1 |
| 124 | 65 | N | N | N | 55 | Y | 1 |
| 126 | 65 | N | N | N | 55 | Y | 1 |
| 142 | 65 | N | N | N | 55 | Y | 1 |
| 150 | 65 | 66 | N | N | 55 | Y | 2 |
| 174 | 65 | 66 | N | N | 55 | Y | 2 |
| 178 | 65 | N | N | N | 55 | Y | 1 |
| 183 | 65 | N | N | N | 55 | Y | 1 |
| 191 | 65 | N | N | N | 55 | Y | 1 |
| 199 | 65 | N | N | N | 55 | Y | 1 |
| 212 | 65 | N | N | N | 55 | Y | 1 |
| 239 | 65 | 66 | N | N | 55 | Y | 2 |
| 22 | 104 | N | N | N | 55 | Y | 1 |
| 47 | 104 | N | N | N | 55 | Y | 1 |
| 3 | 104 | N | N | N | 3.189315305 | N | 1 |
| 28 | 104 | N | N | N | 1.137612752 | N | 1 |
| 42 | 104 | N | N | N | 1.133071943 | N | 1 |
| 100 | 200 | N | N | N | 0.007008449 | N | 1 |
| 106 | 200 | N | N | N | 0.006636528 | N | 1 |
| 108 | 200 | N | N | N | 0.007158203 | N | 1 |
| 240 | 200 | N | N | N | 55 | Y | 1 |
| 20 | 210 | N | N | N | 7.697268763 | N | 1 |
| 35 | 210 | N | N | N | 4.433608101 | N | 1 |
| 70 | 210 | N | N | N | 5.609123136 | N | 1 |
| 220 | 210 | N | N | N | 55 | Y | 1 |
| 95 | 212 | N | N | N | 55 | Y | 1 |
| 8 | 212 | N | N | N | 3.276436455 | N | 1 |
| 74 | 212 | N | N | N | 3.258238206 | N | 1 |
| 252 | 212 | N | N | N | 3.835325339 | N | 1 |
| 107 | 216 | N | N | N | 1.084610747 | N | 1 |
| 218 | 216 | N | N | N | 1.379653246 | N | 1 |
| 223 | 216 | N | N | N | 1.605736007 | N | 1 |
| 227 | 216 | N | N | N | 55 | Y | 1 |
| 37 | 218 | N | N | N | 55 | Y | 1 |

FIG. 22B

Final Table 3 Continued                                           2200

| 1402 | 1404 | 1406 | 1408 | 1410 | 1412 | 1414 | 1416 |
|------|------|------|------|------|-------|------|------|
| 41   | 218  | N    | N    | N    | 55    | Y    | 1    |
| 43   | 218  | N    | N    | N    | 55    | Y    | 1    |
| 62   | 218  | N    | N    | N    | 55    | Y    | 1    |
| 75   | 218  | N    | N    | N    | 55    | Y    | 1    |
| 83   | 218  | N    | N    | N    | 55    | Y    | 1    |
| 85   | 218  | N    | N    | N    | 55    | Y    | 1    |
| 88   | 218  | N    | N    | N    | 55    | Y    | 1    |
| 103  | 218  | N    | N    | N    | 55    | Y    | 1    |
| 109  | 218  | N    | N    | N    | 55    | Y    | 1    |
| 110  | 218  | N    | N    | N    | 55    | Y    | 1    |
| 138  | 218  | N    | N    | N    | 55    | Y    | 1    |
| 139  | 218  | N    | N    | N    | 55    | Y    | 1    |
| 153  | 218  | N    | N    | N    | 55    | Y    | 1    |
| 156  | 218  | N    | N    | N    | 55    | Y    | 1    |
| 171  | 218  | N    | N    | N    | 55    | Y    | 1    |
| 186  | 218  | N    | N    | N    | 55    | Y    | 1    |
| 1    | 4    | N    | N    | N    | 55    | Y    | 1    |
| 25   | 4    | N    | N    | N    | 10.52 | N    | 1    |
| 26   | 4    | N    | N    | N    | 10.52 | N    | 1    |
| 89   | 4    | N    | N    | N    | 10.52 | N    | 1    |
| 16   | 4    | N    | N    | N    | 55    | Y    | 1    |
| 39   | 4    | N    | N    | N    | 55    | Y    | 1    |
| 45   | 4    | N    | N    | N    | 55    | Y    | 1    |
| 54   | 4    | N    | N    | N    | 55    | Y    | 1    |
| 68   | 4    | N    | N    | N    | 55    | Y    | 1    |
| 77   | 4    | N    | N    | N    | 55    | Y    | 1    |
| 79   | 4    | N    | N    | N    | 55    | Y    | 1    |
| 96   | 4    | N    | N    | N    | 55    | Y    | 1    |
| 206  | 4    | N    | N    | N    | 55    | Y    | 1    |

FIG. 22C

OPTIMIZING THE NUMBER OF IMS DEPENDENT REGIONS

CROSS REFERENCE TO RELATED APPLICATION

This application claims priority to India Provisional Patent Application No. 202141049064, filed Oct. 27, 2021, titled "Optimizing The Number Of IMS Dependent Regions," which is hereby incorporated by reference in its entirety.

TECHNICAL FIELD

This description relates optimizing the number of IMS (e.g., IBM®IMS™ database) dependent regions.

BACKGROUND

Tuning the IBM®IMS™ database management software system (referred to throughout this document as IMS) is a difficult task. One of the most complex areas in tuning the IMS system is IMS transaction scheduling. An untuned IMS system can cause various issues, including transaction execution delay due to IMS regions not being available to schedule and the consumption of a greater number of central processing unit (CPU) cycles in the IMS control region (CTL) because the IMS scheduler has to search for an available region. In addition, for transactions that access an IBM® Db2® data management product (referred to as Db2 throughout this document), a large amount of CPU cycles may be needed to create an environment newly accessed by Db2. Further, the untuned IMS system can also result in over-allocating system memory due to program preload, which causes paging in an operating system level. The untuned IMS system can also result in multiple additional input/output (I/O) cycles to load programs for scheduling. It is desirable to achieve improved IMS transaction scheduling through a technical solution to have a better tuned IMS system that avoids these negative technical problems.

Additionally, in a production IMS system, a class may be defined to handle low volume transactions. Usually, this class is served by multiple regions. Over time, the transaction volumes for the class may grow, and additional regions may be added to serve this class. Eventually, the number of regions may become too large to manage efficiently. Additionally, IMS scheduling may be inefficient and not optimized, which may cause and result in poor transaction response time and high CPU consumption. It is desirable to provide a technical solution to improve the scheduling of these transactions to improve response time and to improve CPU consumption.

Furthermore, in a production IMS system, the IMS workload may change dramatically during the day where the workload changes between peak-time hours and off-hours (or off peak-time hours). The number of IMS dependent regions, also referred to as message processing regions (MPRs), required to handle the throughput in such cases can vary greatly; however, the way this is handled currently is that most installations merely allocate the maximum number of MPRs to handle the largest workload during peak-time hours and leave the regions idle during off-hours.

In another situation, when a new application is deployed in the production system, a systems programmer usually starts a new region to isolate the problem without interrupting the existing applications. Even though the new application may not require the whole region, over time, this unnecessarily expands the number of MPRs in an untuned system.

Most of the time, a systems programmer allocates more MPRs than the IMS system actually requires. Finding an optimum number of MPRs in the IMS system, especially for different time frames, requires extensive analysis of the workload and the knowledge of both the IMS system and the applications executing on the IMS system.

Over allocation of MPRs may cause CPU overhead and paging to the IMS system and reduce critical virtual storage such as common service area/extended common service area (CSA/ECSA). On the other hand, under allocating MPRs can cause lower throughput due to transaction queuing un-evenly allocated MPRs for different workloads and timeframes.

SUMMARY

In some aspects, the techniques described herein relate to a computer-implemented method for determining an optimal number of regions in an IMS system, the method including: receiving a transaction report from a log dataset; generating a first table from the transaction report, where the first table includes a class identified by a class identifier (ID), a number of regions the class is assigned, and a total percent region occupancy by the class; identifying classes ineligible to be shut down based on a set of criteria and eliminating the classes ineligible to be shut down; and for each remaining class assigned to a threshold number of regions: identifying candidate regions from the threshold number of regions eligible for shut down, and identifying remaining regions from the threshold number of regions that can handle a workload from the candidate regions eligible for shut down, where the remaining regions represent the optimal number of regions in the IMS system.

According to other general aspects, a computer program product may execute instructions and cause a computing device to perform the computer-implemented method. According to other general aspects, a system, such as a computing system, a mainframe system, or a distributed server system, may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 3 is an example report of the IMS system's scheduling statistics report.

FIG. 4 is an example summary recommendation report.

FIG. 5 is an example detailed recommendation report.

FIG. 6 is an example detailed recommendation report at the transaction level.

FIG. 8 is an example first table created as part of the process of FIG. 7.

FIG. 9 is an example second table created as part of the process of FIG. 7.

FIG. 10 is an example updated second table created as part of the process of FIG. 7.

FIG. 12 is an example first table (Table 1) created by the process illustrated in FIGS. 11A and 11B.

FIGS. 13A, 13B, and 13C illustrate a second table (Table 2) created by the process illustrated in FIGS. 11A and 11B.

FIGS. 14A, 14B, and 14C illustrate a third table (Table 3) created by the process illustrated in FIGS. 11A and 11B.

FIGS. 15A, 15B, and 15C illustrate a updated third table (Updated Table 3) created by the process illustrated in FIGS. 11A and 11B.

FIG. 16 illustrates an example snippet of the second table (Snippet of Table 2) created by the process illustrated in FIGS. 11A and 11B.

FIG. 17 illustrates an example updated snippet of the second table (Updated Snippet of Table 2) created by the process illustrated in FIGS. 11A and 11B.

FIGS. 18A, 18B, and 18C illustrate a updated third table (Updated Table 3) created by the process illustrated in FIGS. 11A and 11B.

FIG. 19 illustrates an updated first table (Updated Table 1) created by the process illustrated in FIGS. 11A and 11B.

FIG. 21 illustrates a final second table (Final Table 2) created by the process illustrated in FIGS. 11A and 11B.

FIGS. 22A, 22B, and 22C illustrate a final third table (Final Table 3) created by the process illustrated in FIGS. 11A and 11B.

DETAILED DESCRIPTION

Figure 1:
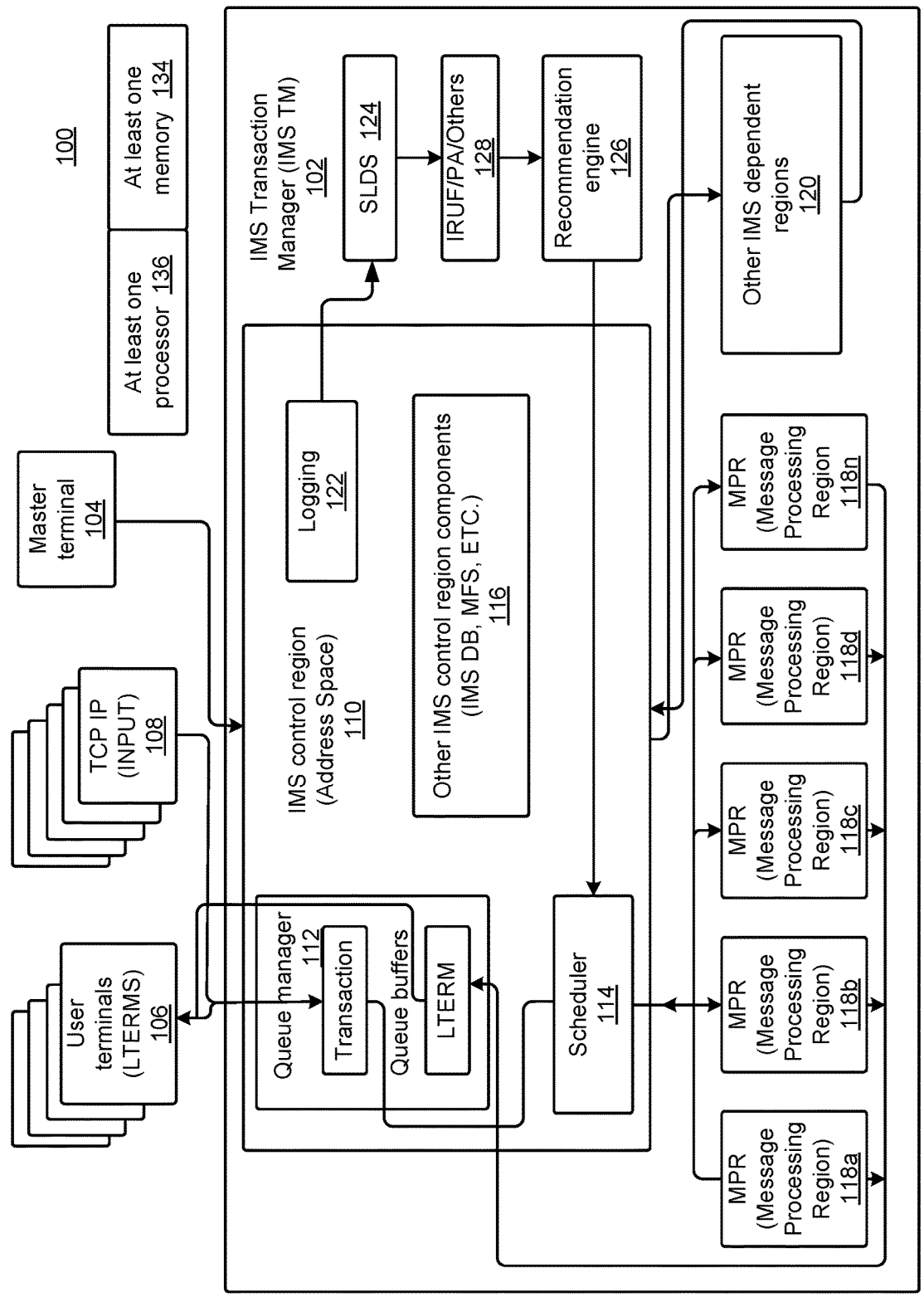
FIG. 1 is a block diagram of an example system for IMS transaction scheduling and processing.

This document describes systems and techniques for improved IMS transaction scheduling that results in a better tuned IMS system. In general, IMS is a hierarchical database management software system for online transaction processing (OLTP) and online batch processing that may process thousands, millions, billions, and up to trillions of transactions over a period of time (e.g., over a day, week, etc.). The IMS system is used in many different industries including, for example, banking, travel, healthcare, communication, automotive, retail, manufacturing, oil and gas, energy, as well as other industries. The IMS system includes the IMS transaction manager (IMS TM) that manages, schedules, and performs OLTP for applications that access IMS data as well as data stored in the Db2 database.

One aspect for tuning the IMS system is to improve the efficiency and scheduling of the IMS TM by defining transactions as wait-for-input (WFI) or defining regions as pseudo-wait-for-input (P-WFI). In other terms, defining transactions as WFI effectively allocates an IMS region or IMS address space as a WFI region for a selected transaction. Defining a region as running under P-WFI effectively allocates an IMS region or IMS address space as the P-WFI region. The WFI region or the P-WFI region defined for the selected transaction means that the selected region is already initialized to process additional transactions (or messages) identified to run on the selected region without having to reinitialize the region to process the additional transactions (or messages). When a transaction is defined as WFI, the IMS system starts the transaction running in the region and, upon completion of the execution of the transaction, the transaction remains in the region waiting for another same transaction or another message for the same transaction. In this manner, the transaction occupying the IMS region waits for the next message for the same transaction to execute without having to go through reinitialization and without having to reinitialize the IMS region to execute the next message.

A goal of IMS transaction scheduling is to find and schedule transactions as WFI or as running P-WFI in an efficient manner so that once the transaction completes, the transaction can remain in the same region and execute the next transactions. A challenge to selecting and defining transactions as WFI or running as P-WFI region is the limited number of regions in the IMS system that can be occupied. Thus, not every IMS transaction can be defined as WFI or P-WFI due to the limited number of regions.

The systems and techniques described herein identify the limited number of IMS regions as WFI or P-WFI and thus improve IMS transaction scheduling by designating IMS transactions to run as WFI or running in the P-WFI region. IMS transaction response time and transaction queuing time are improved by intelligently recommending which transactions to assign as WFI or running in the P-WFI region and how many WFI or P-WFI regions are required for each reassigned transaction. By using IMS log dataset(s), the systems and techniques described herein analyse each transaction based on various criteria, including the CPU usage for scheduling, the elapsed time for schedule to a first Data Language Interface (DLI) call, the transaction elapsed time, class assignment, and other criteria. User input may be another criterion used to decide the eligibility for designating or recommending a transaction as WFI or running in the P-WFI region. These techniques result in an optimization for identifying which transactions to schedule as WFI and running in the P-WFI region and which IMS regions are WFI or P-WFI. In this manner, more efficient use of the IMS TM, including its components such as the IMS scheduler, and the resources the IMS scheduler are realized by consumers.

Additionally, the systems and techniques described herein reduce the need of experienced systems programmers to tune the IMS system, the time to analyse the data, and the guess work historically involved in designating transactions as WFI or running under the P-WFI region. The systems and techniques provide accurate suggestions for making changes to the system using precise metrics rather than guesswork. Using the described technical solutions for the above-identified technical problems results in multiple, realized improvements to the computing system. For example, the systems and techniques reduce transaction queue time since WFI transactions and/or transactions running under the P-WFI region do not go through complicated scheduling logic. The IMS program does not need to re-initialize and is ready to take on a new transaction. CPU consumption is reduced, especially for transactions accessing Db2 database resources, because once a transaction is designated as WFI, the IMS scheduler does not need to use CPU resources to schedule subsequent transactions that can be executed by the existing WFI transaction in a particular region. The systems and techniques described herein reduce input/output (I/O) cycles by not having to load the application programs because the application programs are already scheduled in the region. Additionally, the systems and techniques described herein improve response time for other processes and cycles as a result of the total time reductions when there are many IMS and Db2 transactions.

Further, the systems and techniques described herein allow systems programmers to pick out transactions that have high volume that is not high enough to warrant a separate message processing region (MPR). By grouping these high-volume transactions together and assigning them into a new class to run in a P-WFI environment, it is not necessary to add new MPRs for the new class, but rather, it is possible to reuse the existing P-WFI MPRs.

By doing this, the picked-out transactions will have a much higher chance to be scheduled without the scheduling overhead due to P-WFI and experience less interference from other low volume transactions. Therefore, CPU utilization by IMS and therefore transaction response time are reduced.

Additionally, the systems and techniques described herein allow IMS system programmers to tune IMS by recommending how to allocate the number of IMS MPRs for a particular timeframe and/or by automatically allocating the number of IMS MPRs for a particular timeframe. By using IMS log dataset(s), the systems and techniques described herein analyze each region by calculating its region occupancy, class assignment, transaction elapsed time, number of MPR's executing the class, and provide a recommendation(s) to setup MPRs, based on received input, including input from a user. In this manner, the IMS system can be tuned to allocate the number of MPRs for particular timeframes using the IMS log dataset(s) from the particular timeframes to determine and recommend an optimal number of MPRs to allocate in the IMS system.

The systems and techniques described herein reduce the need for experienced systems programmers, reduce the time needed to analyze the data, and eliminates the guess work for making recommendations to setup MPRs. The systems and techniques described herein provide accurate suggestions for making changes to the IMS system with precise metrics. The systems and techniques described herein provide specific technical solutions and technical improvements to the IMS system (e.g., mainframe computing system) by reducing CPU consumption due to less system overhead, reducing system paging due to correct MPR allocation, and reducing virtual storage allocation such as common service area/extended common service area (CSA/ECSA).

The following terms are used throughout this document:

PRSPGSCH—a program scheduling statistics report—this is a report that is created having multiple data points.

CSV—Comma separated values.

SLDS—an IMS system log data set—created by the IMS system to record the transactions occurring on the IMS system.

IRUF—an offline IMS resource utilization file for applications an example of which is BMC Software's AMI Ops for IMS product.

REGION/MPR—an IMS Message processing region—this is a region or address space in the IMS system where transactions can be executed.

WFI—IMS Wait-for-input—a transaction that is designated as WFI and assigned to a message processing region (MPR) that it occupies for approximately the next 64,000 iterations. When those iterations are completed, the IMS scheduler schedules another WFI transaction having the same criteria as the MPR-occupying transaction for execution during the next iterations. When the transaction is scheduled as WFI, the IMS scheduler selects an available MPR, and the IMS scheduler loads the appropriate program(s), creates the environment, optionally loads the transmission control protocol/internet protocol (TCP/IP or TCP IP) input for Db2-based transactions in the selected MPR. The transaction executes in the MPR using the loaded resource and continues to occupy the MPR after execution of the transaction is completed. The scheduler places the MPR in a wait state and maintains the allocation. The scheduler only terminates the transaction if any of the following are true: The limit for the number of input messages processed or the processing time (PROCLIM) count is reached or a command to stop the MPR is entered.

P-WFI—IMS Pseudo-wait-for-input—a region or MPR designated P-WFI enables a region to remain scheduled as the P-WFI region and process additional messages for the same transaction until another input message appears for a different transaction. When a transaction is scheduled as P-WFI, the IMS scheduler selects an available MPR, and the IMS scheduler loads the appropriate program(s), creates the environment, and optionally loads the TCP IP input for Db2-based transactions in the selected MPR. The transaction executes in the MPR using the loaded resource and continues to occupy the MPR after execution of the transaction is completed. The scheduler does not terminate the transaction when the transaction is completed. Instead, the scheduler maintains the region as P-WFI in a wait state for other transactions of the same class. When IMS needs the P-WFI region to schedule a transaction, IMS terminates the transaction and initializes the region for the new transaction.

Db2—IBM® Db2® Database

FIG. 1 is a block diagram of a portion of an example system 100 for IMS transaction scheduling and processing. The system 100 illustrates some components of the IMS system, including those components related to transaction scheduling and processing. It is understood by those skilled in the art that the system 100 may include other IMS components that are part of the IMS system, but that are not illustrated in this figure for simplicity of discussion.

The IMS system 100 includes an IMS transaction manager (IMS TM) 102. IMS TM 102 manages, schedules, and performs online transaction processing for applications that access the IMS system as well as data stored in the Db2 database. IMS TM 102 may process different types of IMS messages including, for example, transactions, message-switches, and commands. Most types of IMS TM 102 IMS messages are in the form of transactions. Transactions may originate from various different sources depending on the type of industry or application using the IMS system. IMS TM 102 schedules and processes input messages from a variety of sources, processes messages sent outbound from IMS applications, and provides a message queuing and scheduling mechanism for messages in different message processing regions MPRs 118a-118n.

IMS TM 102 receives input from a master terminal 104, multiple user terminals 106 (also referred to as logical terminals (LTERMS) 106), and multiple TCP IP inputs 108. The master terminal 104, LTERMS 106, and TCP IP inputs 108 interact and exchange communications with IMS TM 102.

IMS TM 102 includes an IMS control region (address space) 110. IMS control region 110 controls how IMS makes data available to an end-user, controls a queue manager 112 to queue and manage transactions, and controls a scheduler 114 to schedule transactions for processing in one or more IMS regions. IMS control region 110 includes other IMS control region components 116 such as, for example, IMS DB, message format service (MFS), and other components.

The queue manager 112 receives and stores messages, including transactions, by destination, priority, and the time of arrival in IMS. As discussed in more detail below, the scheduler 114 schedules the messages, including the transactions, for processing in the MPRs 118a-118n. A logging module 122 logs the transactions and stores the logged data in a system data log set (SLDS) 124. The recommendation engine 126 receives input from the SLDS 124 and data from the IMS resource utilization files (IRUFs), performance analyser (PA), and other files 128 to generate a recommendation for which transactions to designate as WFI and which regions to designate as P-WFI.

IMS TM 102 includes different types of IMS regions that are used to process messages. IMS TM 102 includes multiple message processing regions (MPRs) 118a-118n, which are the locations where transactions are processed in real time. Other IMS dependent regions 120 may include batch message processing regions, JAVA processing regions, IMS fast path regions, and other types of regions. In some implementations, IMS TM 102 may include for example, 999 MPRs 118a-118n, and in some implementations, IMS TM 102 may include a different number of MPRs 118a-118n. It is understood that while only 5 MPRs are illustrated in FIG. 1, the reference numbers 118a-118n are meant to convey any number of MPRs including for example, 999 MPRs or a different number of MPRs.

In some implementations, each of the MPRs 118a-118n may be allocated to handle one transaction. Thus, for an IMS TM 102 having for example, 999 MPRs, a total of 999 transactions may be schedule for concurrent, parallel processing.

The response time of each IMS transaction is a critical performance criterion for an IMS system. Various factors impact response time of IMS transactions, such as transaction queuing, program scheduling, program execution, IMS database access, Db2 database access, de-queue time, etc. Tuning of transaction scheduling is one of the ways to improve response time. Scheduling the transaction as WFI or regions as running P-WFI can reduce the schedule to the first DLI call time significantly improving the overall response time of the transaction. The first DLI call time is the amount of time it takes for the scheduler to load a program from the library to storage until the loaded program makes a first DLI call to the IMS system for the transaction. Not all transactions can or should be scheduled as WFI or for running in a P-WFI region. Various factors need to be considered for scheduling transactions as WFI or for running in a P-WFI region. Currently, system programmers consider some data points to guess which transactions should be scheduled as WFI or for running in a P-WFI region. The system and techniques described herein take the guess work and risk making the wrong call out of scheduling transactions in the IMS system.

The system 100 also includes at least one memory 134 and at least one processor 136. The at least one processor 136 may represent two or more processors in the system 100 executing in parallel and utilizing corresponding instructions stored using the at least one memory 134. The at least one processor 136 may include at least one central processing unit (CPU). The at least one memory 134 represents a non-transitory computer-readable storage medium. Of course, similarly, the at least one memory 134 may represent one or more different types of memory utilized by the system 100. In addition to storing instructions, which allow the at least one processor 136 to implement the IMS TM 102 and its various components, the at least one memory 134 may be used to store data and other information used by and/or generated by the IMS TM 102 and the components used by the IMS TM 102.

The techniques described below in FIGS. 2A-2C as implemented by the IMS TM 102 of FIG. 1, including the IMS control region 110, the queue manager 112, and the recommendation engine 126, analyse various data points as described below to generate WFI or P-WFI recommendations without adversely impacting resource utilization. This improves overall transaction response time and eliminates guess work and risk of making the wrong guess, as well as achieves the other advantages and improvements described throughout this document. In some implementations, the output of the process of FIGS. 2A-2C automatically schedules the transactions for WFI or regions running as P-WFI, as recommended, for processing and execution in one or more designated MPRs 118a-118n.

Figure 2A:
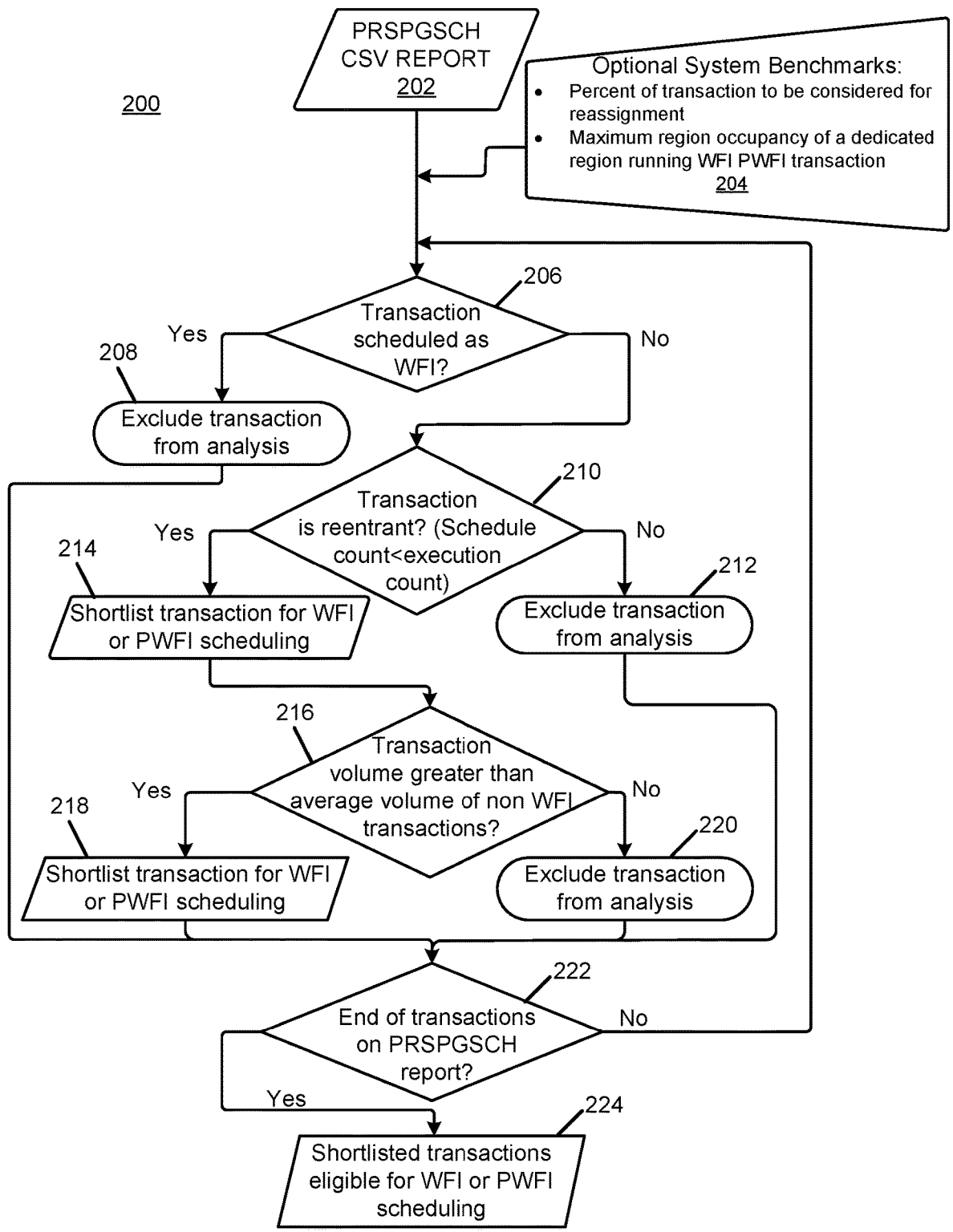
FIGS. 2A-2C illustrate an example flow diagram of a process for recommending transactions for scheduling as WFI or regions as P-WFI using the system of FIG. 1.
Figure 2B:
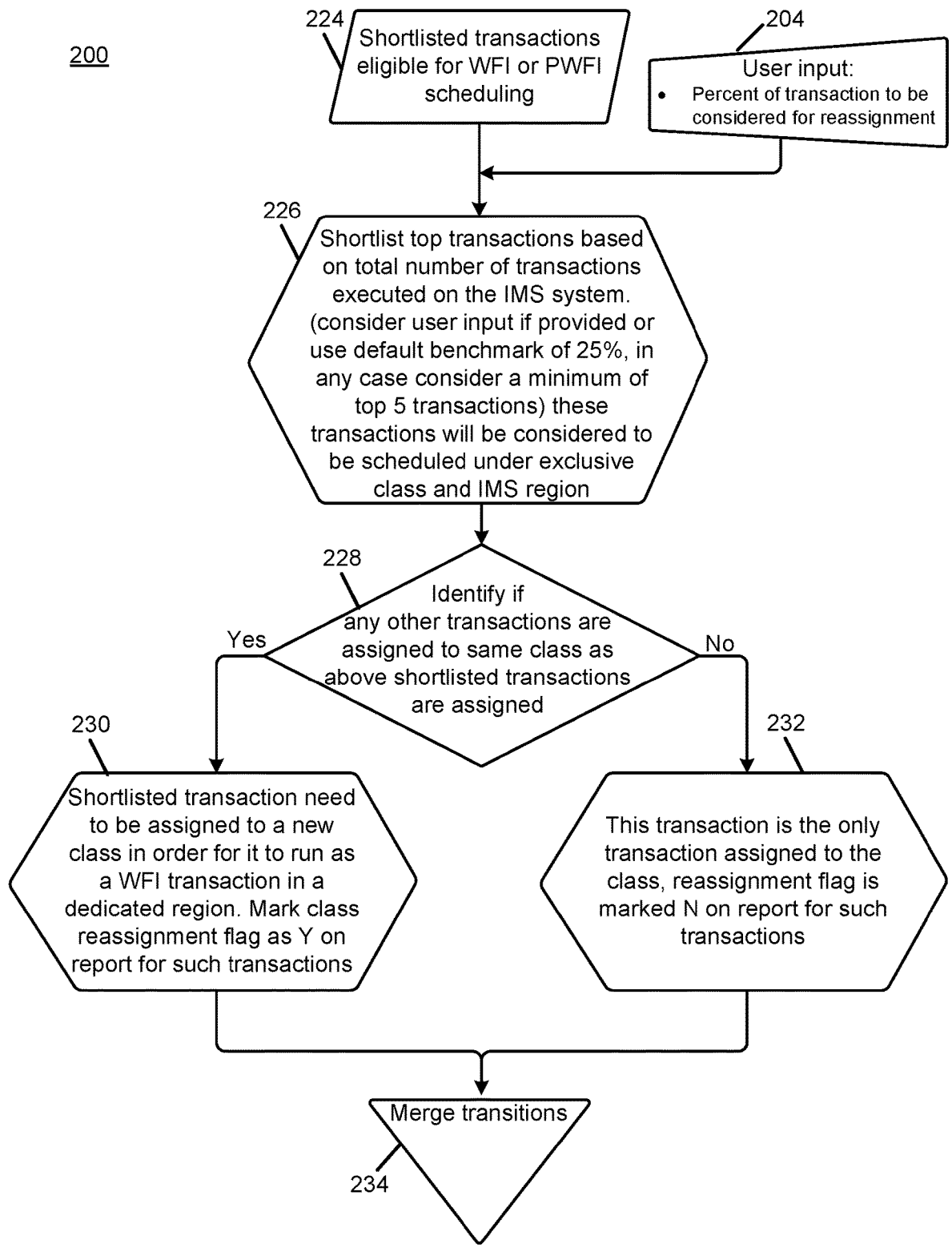
Figure 2C:
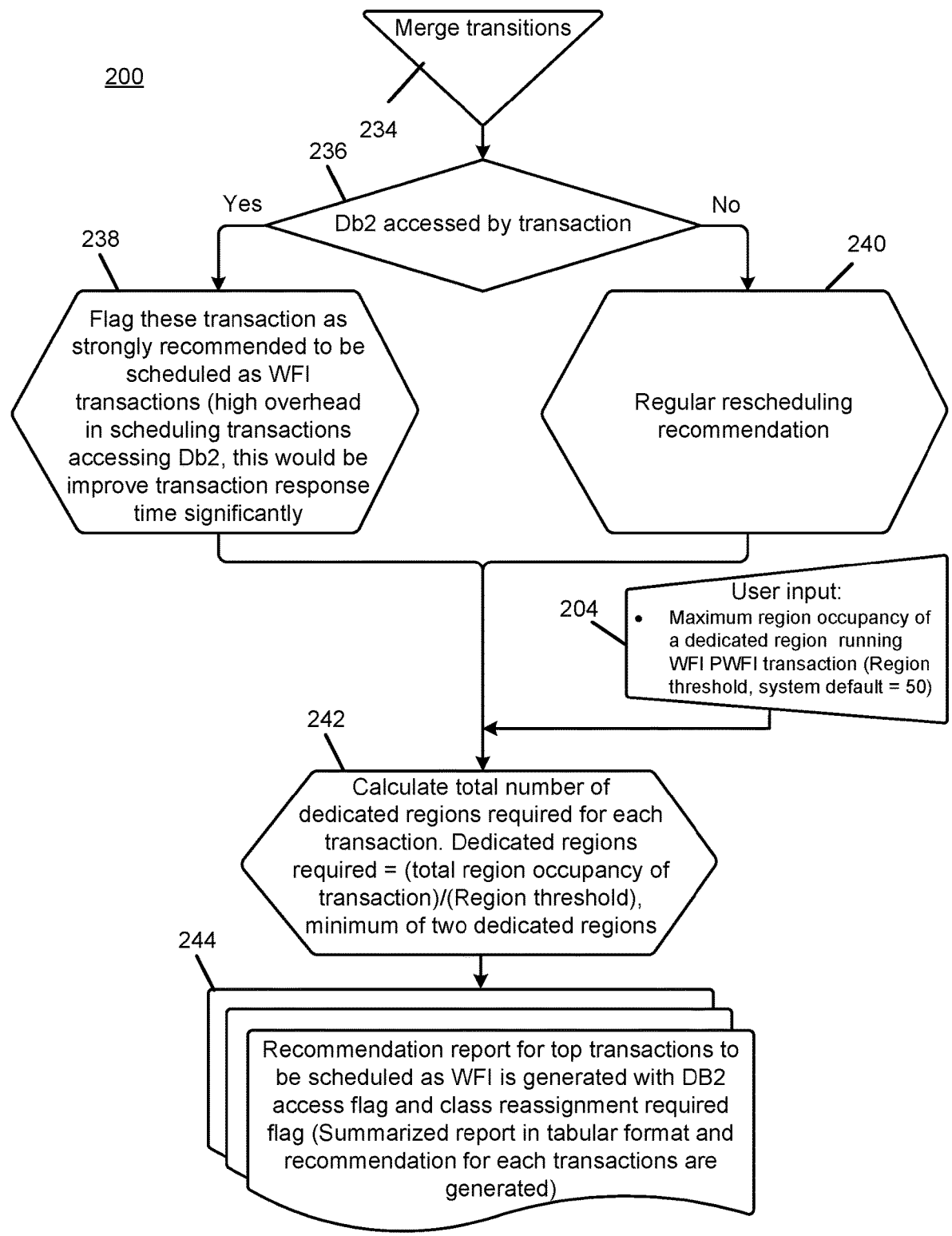

FIGS. 2A-2C illustrate a process 200 a process for recommending transactions for scheduling as WFI or regions running as P-WFI using the system of FIG. 1. Process 200 starts on FIG. 2A and continues onto FIGS. 2B and 2C.

Referring to FIG. 2A, a PRSPGSCH CSV report (202) in character separated value format (CSV) is used as an input for this process. The PRSPGSCH CSV report has the fields listed in example PRSPGSCH CSV report 300 (or report 300) of FIG. 3. In some implementations, other reports may be used or have the same or similar data as the report 300, including, for example, the IBM Performance Analyzer report, the IMS system's data communications (IMS/DC) monitor report, or other similar types of reports.

As illustrated in FIG. 3, the report 300 includes multiple data metrics. One metric includes a total duration for the input data being processed that is labelled Total System elapsed time 324. The first record of the CSV report has the start time of the first SLDS 124 log record and the end time of the SLDS log record from IRUF 128. For example, the total system elapsed time 324 may range from approximately multiple seconds to multiple hours to a day or to multiple days' worth of data for transaction processing. The recommendation engine 126 processes input data from SLDS 124 and IRUF 128 to find the total system elapsed time 324, where the total system elapsed time 324 equals the end time on the last SLDS 124 record minus the start time on first SLDS 124 record.

The IMS region ID 302 is the identifier of the region, and the Region name 304 is the name of the region where the transaction exists. The transaction name 306 refers to a name of the transaction associated with the IMS region ID 302.

The region type 308 refers to the type of region that is designated for the transaction. For example, the type of region 308 may be designated as the WFI region, the P-WFI region, a non-designated or blank region, or other type of region.

The class ID 310 refers to the class identification for the transaction.

The program schedule count 312 refers to the number of schedules that take place in the MPRs 118a-118n for the transaction.

The transaction execution count 314 refers to the number of transactions that execute within a period of time in the MPRs 118a-118n.

The transaction accessing Db2 flag 316 provides an indicator of whether or not the transaction accesses the Db2 database. For example, if the flag is set (e.g., set to 1, True, etc.), then the transaction accesses the Db2 database. If the flag is not set (e.g., blank or set to 0, False, etc.), then the transaction does not access the Db2 database.

The total schedule to 1$^{st}$ DLI CPU 318 refers to a measure of the CPU resources that were consumed by the transaction during the period of time that starts when the scheduler retrieves the transaction from the queue manager until the Pt DLI call.

The total schedule to 1$^{st}$ DLI time 320 refers to an amount of time the transaction takes from the time the transaction entered the queue manager 112 through the time the IMS TM schedules one of the MPRs 118a-118n until the time the application performs a 1$^{st}$ DLI call.

The total transaction response time 322 refers to an amount of time the transaction takes as measured from the time the transaction enters the queue manager 112 until the time the transaction completes with an output.

The metrics in the report are used to determine which future transactions should be designated as WFI and regions as P-WFI.

As illustrated in the example report 300 in FIG. 3, there is one unique record for every IMS Region ID 302 and a specific transaction name 306 on the report 300.

In step 204, additional, optional system benchmarks may be input into the scheduler. In some implementations, a user may be prompted to enter and/or confirm these system benchmarks. In some implementations, the system benchmarks may be automatically included as system defaults that are input to the recommendation engine 126 without user prompting or user intervention. In some implementations, the system benchmarks may be system defaults that are dynamically modified using a machine learning module and process. Using a machine learning process, the values for the system benchmarks dynamically change over time in a manner that further optimizes the recommendation engine 126. The system benchmark values include: a) A percentage of transactions to consider for reassignment to the dedicated MPR from among MPRs 118a-118n (between 0-100%); and/or b) A maximum region occupancy of the dedicated MPR from among MPRs 118a-118n running a WFI transaction or running as P-WFI region (between 20-80%).

The report 300, in combination with the operational system benchmarks 204, report the transactions that can be scheduled as WFI or regions as running P-WFI to improve total transaction response time 322 by reducing the amount of time the scheduler 114 takes to schedule to the first DLI. The total transaction response time 322 is improved by the recommendation engine 126 using the inputs to improve scheduling to reduce the total schedule to Pt DLI time 320.

The recommendation engine 126 first determines if a new transaction is already scheduled as a WFI (206). That is, the recommendation engine 126 determines if a transaction is already allocated to an MPR from among MPRs 118a-118n. If the transaction is allocated to an MPR from among MPRs 118a-118n, then that transaction is excluded from the analysis (208). If the transaction is not already scheduled as a WFI transaction, then the transaction is processed for further analysis to determine if the transaction should be scheduled as a WFI transaction.

For a transaction not already scheduled as a WFI transaction, the recommendation engine 126 next determines whether or not the transaction is re-entrant (i.e., the schedule count is less than the execution count) (210). If the recommendation engine 126 determines that the transaction is not re-entrant, then the transaction is excluded from further analysis (212) and excluded from further consideration of being designated as a WFI transaction. In this manner, this avoids potential issues because if the non-re-entrant transaction is scheduled as a WFI transaction, the transaction could abend or have invalid data. If the recommendation engine 126 determines that the transaction is re-entrant, then the transaction is processed for further analysis to determine if the transaction should be scheduled as a WFI transaction.

The recommendation engine 126 determines whether or not the transaction is re-entrant by comparing the program schedule count 312 metric to the transaction execution count 314 metric. If the program schedule count metric 312 is less than the transaction execution count 314 metric, then the transaction is re-entrant and is processed by the recommendation engine 126 for further analysis. If the program schedule count 312 metric is not less than the transaction execution count 314 metric, then the transaction may not be re-entrant, and the recommendation engine 126 excludes the transaction from further analysis. In this manner, a transaction with an execution count of past transactions successfully executing without abending are processed by the recommendation engine 126 for further analysis.

More specifically, to find the re-entrant program not running as WFI or P-WFI, the recommendation engine 126 may perform the following steps:
  a) build tables for WFI and non-WFI transactions;
  b) from the table of non-WFI transactions (a) identify the re-entrant program by determining the program schedule count 312 that is less than the transaction execution count 314;
  c) calculate the average transaction count of the non WFI transactions, where:
  Average transaction count=(Total non-WFI (a) transaction execution count 314) divided by the count of unique non-WFI transactions from (a) above); and
  d) filter out transactions that are not re-entrant or have transaction execution count 314 less than the average transaction count calculated in (c) above from the tables (a) above.

With the above process, the recommendation engine 126 identifies the data of re-entrant transactions that are able to be scheduled as WFI or regions as running P-WFI and that have a transaction count greater than the average transaction count. The shortlist of transactions that are re-entrant is further processed for WFI or P-WFI scheduling (214).

The scheduler 114 further evaluates the list of re-entrant transactions because not all of the re-entrant transactions should be scheduled as WFI or for running in a P-WFI region. The recommendation engine 126 evaluates if the transaction volume of the re-entrant transactions is greater than the average volume of non-WFI transactions (216). If this transaction volume is greater than the average volume of non-WFI transactions, then the transaction remains on the shortlist of transactions for WFI or P-WFI scheduling (218). If this transaction volume is not greater than the average volume of non-WFI transactions, then the transaction is removed from the list and the transaction is excluded from further analysis (220). In this manner, low volume transactions as compared to other transactions are removed from the list and are not considered for further analysis.

For example, if the average volume of non-WFI transactions is 1000 transactions and the transaction volume for a class of transactions in the report is equal to 1000 transactions, then that transaction class is excluded from being designated or marked as a WFI transaction or for running in a P-WFI region. In this example, if the transaction volume for a class of transactions in the report is greater than 1000 transaction, then that transaction remains on the list for further processing for designation or marking as a WFI transaction or for running in a P-WFI region.

After filtering the CVS report 300 based on the above criteria (already WFI, re-entrant, and volume) up to the end of the transactions on the PRSPGSCH report (222), the remaining shortlisted transactions are eligible for WFI or for P-WFI region scheduling (224) by the scheduler 114. Continuing on to FIG. 2B, one of the system benchmarks described above may be applied to this list of transactions. The system benchmark considered is the percent of transactions to be considered for reassignment (204). As discussed above, this system benchmark may be input by a user, such as a system programmer, or may be a default benchmark. First, the recommendation engine 126 considers the data in the table created above in a) in descending order on transaction execution count field 314. Then, the recommendation engine 126 applies the system benchmark. If the system benchmark is not provided by a user, then a default system benchmark may be applied. For example, in some implementations a default system benchmark of 25% of transactions that should be scheduled as WFI may be applied. In some implementations, the default system benchmark may be a different percentage such as, for example, a percent anywhere in the range of from 1% to 100%. In some implementations, the default system benchmark is configurable and/or may be dynamically adjusted through machine learning techniques. In some implementations, the user input and/or the default system benchmark may be iteratively changed over time, taking into account varying loads and time of day.

After applying the system benchmark input, the recommendation engine 126 generates a shortlist of top transactions based on the total number of transactions executed on the IMS system (226). In some implementations, if no system benchmark is applied, a default minimum number of the top transactions are placed on the shortlist. For example, the default benchmark of 25% of transactions or the minimum of the top 5 transactions may be considered to determine the transactions that will be considered to be scheduled under exclusive class and IMS region (226). Using the data from the table created above in a), the recommendation engine 126 finds the top percentage set for recommendation to run as WFI transaction and the rest of the transactions can be scheduled for running in a P-WFI region.

Next, the recommendation engine 126 identifies if any other transactions are assigned to the same class as the class to which the shortlisted transactions are assigned (228). If the recommendation engine 126 does find that the shortlisted transactions need to be assigned to the new class in order to run WFI transaction in a dedicated region, the class reassignment flag is marked as 'Y' on the recommendation report for such transactions (230). If the recommendation engine 126 does not find any other transactions assigned to the same class, then this transaction is the only transaction assigned to the class, and the reassignment flag is marked "N" on the recommendation report for such transactions (232). This process is repeated for all transactions in the table. Since WFI transactions require a dedicated class, each transaction with class reassignment value 'Y' on the report will be assigned a new class.

The recommendation engine 126 merges transactions that remain in the same class and transactions that have been reassigned to a new or different class (234).

Continuing on to FIG. 2C, the recommendation engine 126 then verifies whether the transaction accesses the Db2 database subsystem (236) by checking the value on the CVS report 300. For transactions that access the Db2 database, then the scheduler 114 flags these transactions as strongly recommended to be scheduled as WFI transactions (238) and sets the access flag on the recommendation report to 'Y'. There is a high overhead in scheduling transactions that access the Db2 database. These transactions are strongly recommended to be scheduled as WFI or for running in a P-WFI region because the transaction response time would be improved significantly. For transactions that do not access the Db2 database, then the recommendation engine 126 sets the Db2 access flag on the recommendation report to 'N' or, in some implementations, leaves the access flag blank and regular rescheduling is recommended (240).

The recommendation engine 126 then considers the second system benchmark regarding the maximum region occupancy of a dedicated region running a WFI transaction or dedicate a region for running as P-WFI (204). This system benchmark may be input by a user, such as a system programmer, or may be dynamically input from a separate machine learning process. In some implementations, the system benchmark may use a default value. In some implementations, the default value may be, for example, 50% for maximum region occupancy of a WFI MPR from among MPRs 118a-118n. It is understood that this default value is configurable and may be changed to any other percentage.

The recommendation engine 126 determines the region occupancy for the transaction by calculating the total number of dedicated regions required for each transaction (242).

The recommendation engine 126 calculates the total number of dedicated regions required for each transaction. The dedicated regions required are equal to the total region occupancy of transactions divided by the region threshold, for a minimum of two dedicated regions (242). The resulting number may be rounded to higher number regions required.

In some implementations, the scheduler 114 then outputs a recommendation report for the top transactions to be scheduled as WFI including the Db2 access flag and class reassignment required flag (244). The recommendation report may be in various different formats. The recommendation report will be in two formats with one format a) illustrated in FIG. 4 in a summary tabular format with an example summary recommendation illustrated in FIG. 5; and the other format b) illustrated in FIG. 6 as a report listing actions required to implement recommendations, which may be for automatic scheduling and implementing. In some implementations, a user may select which transactions identified and recommended by the scheduler 114 to process by the IMS system as recommended.

For example, table 400 of FIG. 4 illustrates an output from the recommendation engine 126. The table 400 includes 1. a dedicated region flag; 2. a transaction name; 3. a program name; 4. class with Class ID; 5. a Db2 access flag; 6. a reassign class flag; 7. a schedule time percent of total response time; and 8. a number of dedicated regions recommended.

In a similar manner, the table 500 of FIG. 5 provides similar information as the table 400 of FIG. 4, but in a different format along with some additional information. Table 500 includes a column for a recommended dedicated region for the transaction. Other columns in table 500 include transaction name (TRAN_NAME), program name (PGM NAME), class, Db2 Access flag, class reassignment recommended flag, recommended number of dedicated regions, the program schedule number (PGM SCH #), the number of regions (RGN), the total region occupancy, the schedule time percent, the total number of CPU cycles until $1^{st}$ DLI CPU call, the total time until $1^{st}$ DLI time call, the total response time, and the number of transactions (TRAN #).

The table 600 in FIG. 6 lists the actions required to implement recommendations, which may be for automatic scheduling and implementing.

In some implementations, the recommendation engine 126 automatically defines the transactions on the recommendation report starting with the transactions at the top of the report as WFI or for running in a P-WFI region in the IMS TM 102.

Response time of IMS transactions is a very critical performance criterion for in the IMS TM 102. Various factors impact response time of IMS transactions, such as transaction queuing, program scheduling, program execution, IMS database access, Db2 access, double-ended queue (deque) time, etc. Tuning of transaction scheduling is one of the ways to improve response time. Scheduling transaction as WFI or running in a P-WFI region can significantly reduce the schedule to first DLI time, improving overall response time of the transactions. Identifying transactions impacted due to large number of transaction assignment to a miscellaneous class can be a very time consuming and cumbersome task. The below process illustrated in FIG. 7, in connection with the IMS system 100 of FIG. 1, can help IMS administrators to identify impacted transactions and reassign the impacted transactions to improve transaction response time and reduce CPU usage.

Figure 7:
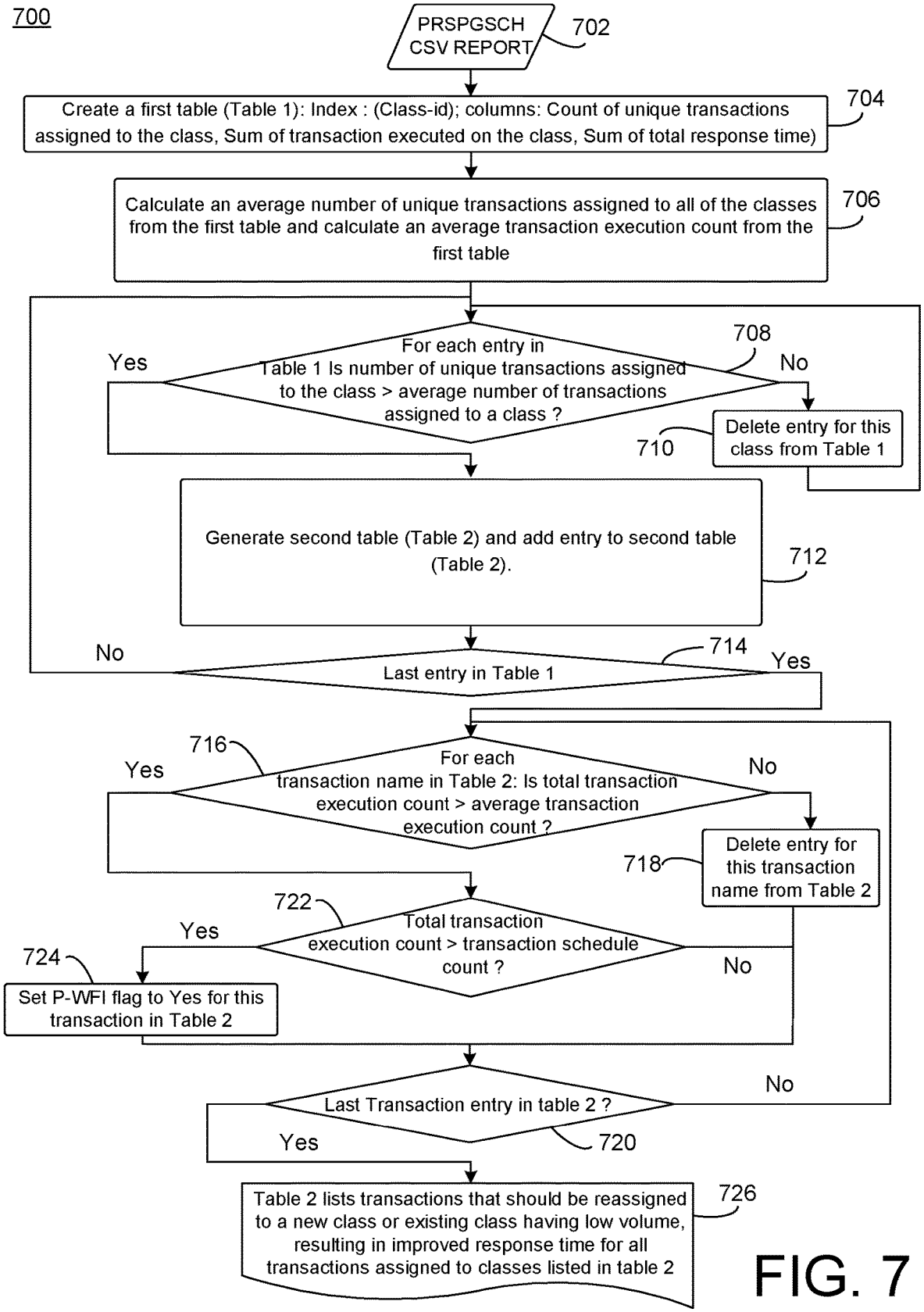
FIG. 7 is an example flow diagram of a process for isolating IMS transactions to the P-WFI region using the system of FIG. 1.

FIG. 7 is an example flow diagram of a process 700 for isolating IMS transactions to a P-WFI region using the system of FIG. 1. Process 700 is a computer-implemented method that may be implemented by the IMS TM 102 and its components, including the recommendation engine 126. Instructions and/or executable code for the performance of process 700 may be stored in the at least one memory 134, and the stored instructions may be executed by the at least one processor 136. Process 700 is also illustrative of a computer program product that may be implemented by the IMS system 100 of FIG. 1.

The PRSPGSCH CSV report (702) is used as an input for the process 700. That is, the recommendation engine 120 may receive a transaction report from a log dataset, where the transaction report is the PRSPGSCH CSV report (702). As discussed in detail above, an example PRSPGSCH CSV report 300 is illustrated in FIG. 3.

Process 700 uses the PRSPGSCH CSV report 300 to create a first table (Table 1) (704) of class identifiers (IDs), count of unique transactions that are assigned to a class, sum of transactions executed on the class, and sum of total response time (704). The first table (Table 1) 800 also may be referred to as a first listing of the transactions as indexed by the class ID for each class of transactions. FIG. 8 is an example first table 800 created as part of the process 700 of FIG. 7.

The first table (Table 1) 800 includes a Class ID 802, count or number of unique transactions assigned to the class 804, the sum of transaction execution count for this class 806, and the sum of total response time in seconds (808). In this example, there are a total of five different classes listed in the Class ID 802 column.

Process 700 includes calculating the average number of unique transactions assigned to a class and calculating the average transaction execution count (706). The average number of unique transactions assigned to a class is the total number of unique transactions executed in the IMS system divided by the total number of active classes. From the first table (Table 1) 800, the total number of classes is the number of different class IDs 802, five, and the total number of unique transactions assigned to the IMS system is the sum, across all classes, of the count of unique transactions assigned to the class 804, which is thirty-six. In this example first table (Table 1) 800, the average number of unique transactions assigned to a class=36/5=7.2.

The average transaction execution count is also calculated, where the average transaction execution count is equal to the total number of transaction execution count divided by the total number of unique transactions assigned to the IMS system. From the first table (Table 1) 800, the total number of unique transactions assigned to all of the classes is 36, which is obtained by summing the entries in column 804. From the first table (Table 1) 800, the total number of transaction execution count for all classes is equal to 4,050,919, which is obtained by summing the entries in column 806. Thus, the average transaction execution count is equal to 4,050,919 divided by 36, which is equal to 112525.53.

Process 700 then iterates through each row in the first table (Table 1) 800. For each entry in the first table (Table 1) 800, it is determined whether the number of unique transactions assigned to the class is greater than the average number of transactions assigned to a class (708). If the number of unique transactions assigned to the class is not greater than the average number of transactions assigned to a class, then the entry for this class is deleted from Table 1 (710), and the process moves to the next entry in the first table (Table 1) 800. If the number of unique transactions assigned to the class is greater than the average number of transactions assigned to a class, then a second table (Table 2) is generated and the entry is added to the second table (Table 2) (712).

For example, with respect to the first entry in the first table (Table 1) 800 having Class ID "Class 1", the number of unique transactions assigned to the class is 8, which is greater than the average number of unique transactions assigned to the class, which is 7.2. Thus, the second table (Table 2) is generated and Class 1 is added to the second table (Table 2) (712).

FIG. 9 is an example of the second table (Table 2) 900 generated as part of the process 700 of FIG. 7. Each entry in the second table 900 represents a transaction assigned to the class. Class Id 902 and transaction name 904 are the fields/columns used as the index of the second table (Table 2) 900. The columns of the second table (Table 2) 900 also include the total transaction execution count for each transaction name 906, total response time 908, total transaction schedule count 910, and P-WFI flag 912. The second table (Table 2) 900 may be sorted on the total transaction execution count for each transaction name 906 and the total response time 908 in descending order, from top to bottom of the columns 906 and 908.

For example, all of the transactions of Class 1 were added to the second (Table 2) table 900. Each entry in the second table (Table 2) 900 is a different transaction of Class 1 having a different transaction name.

After the second table (Table 2) 900 is generated and the entries are added to the second table (Table 2) (712), process 700 determines if that was the last entry in the first table (Table 1) to enter (714). If that was not the last entry from the first table (Table 1), then the process goes back to the next entry in the first table (Table 1) (708). If that was the last entry from the first table (Table 1) 800, then the process 700 continues to the next step. For example, once all of the transactions of Class 1 are added to the second table (Table 2) 900, process 700 goes to the next entry in the first table (Table 1) 800 and applies the criteria to determine whether the class and its transactions should be added to the second table (Table 2) 900. This is done for each entry in the first table (Table 1) 800.

Once the last entry in the first table (Table 1) 800 is processed, then for each transaction name in the second table (Table 2), process 700 determines if the total transaction execution count for each transaction name 906 is greater than the average transaction execution count (716), where the average transaction execution count was calculated above in 706. If the total transaction execution count for each transaction name 906 is not greater than the average transaction execution count, then the entry for the transaction name is deleted from the second table (Table 2) (718), and the process determines whether this was the last entry in the second table (Table 2) (720). If not, then the next entry is processed.

Step (722) of FIG. 7, determines if the total transaction execution count is greater than the transaction schedule count (722), and if so, then the process determines whether the total transaction execution count for each transaction name 906 is greater than the total transaction schedule count 910. If the total transaction execution count for each transaction name 906 is not greater than the total transaction schedule count 910, then the process determines whether this was the last transaction entry in the second table (Table 2) (720). If the total transaction execution count for each transaction name 906 is greater than the total transaction schedule count 910, then the transaction can be assumed to be reentrant and scheduled in a P-WFI MPR from among the MPRs 118a-118n and the P-WFI flag is set to Yes for this transaction in the second table (Table 2) (724). Else, the P-WFI flag 912 is set to No. Once the P-WFI flag 912 is set, the process determines if this was the last transaction entry in the second table (Table 2) (720). The process iterates over each entry in the second table (Table 2) 900 and applies the criteria to determine whether to delete the transaction entry or to keep the transaction entry and set the P-WFI flag 912 to Yes.

Once the last transaction name 904 entry in the second table (Table 2) 900 is processed, then the second table (Table 2) lists the transactions that should be reassigned to a new class, which can run under a P-WFI MPR, or existing class having low volume running under a P-WFI MPR, which results in improved response time for all transactions assigned to the classes listed in the second table (Table 2) (726).

That is, for each class ID and transaction name on the second table (Table 2), the second table (Table 2) is updated to identify one or more of the transactions as candidate transactions for running in a P-WFI region when a total transaction execution count is greater than the average transaction execution count from the first listing and the total transaction execution count is greater than a total transaction schedule count. One way the candidate transactions are identified is by setting the P-WFI flag to Yes, as outlined above. In some implementations, once identified, the candidate transactions may be reassigned to a different class. In some implementations, once identified, the candidate transactions are grouped together and the grouped candidate transactions are assigned to a class for running in the P-WFI region.

FIG. 10 is an example updated second table (Updated Table 2) 1000 created as part of the process of FIG. 7. Updated second table (Updated Table 2) 1000 would represent a snapshot of the transactions that can be reassigned to a different class. Transactions having a P-WFI flag (912) of "Yes" can be grouped together and assigned to a class that can be executed under a P-WFI MPR reducing CPU consumption and response time of transactions.

Figure 11A:
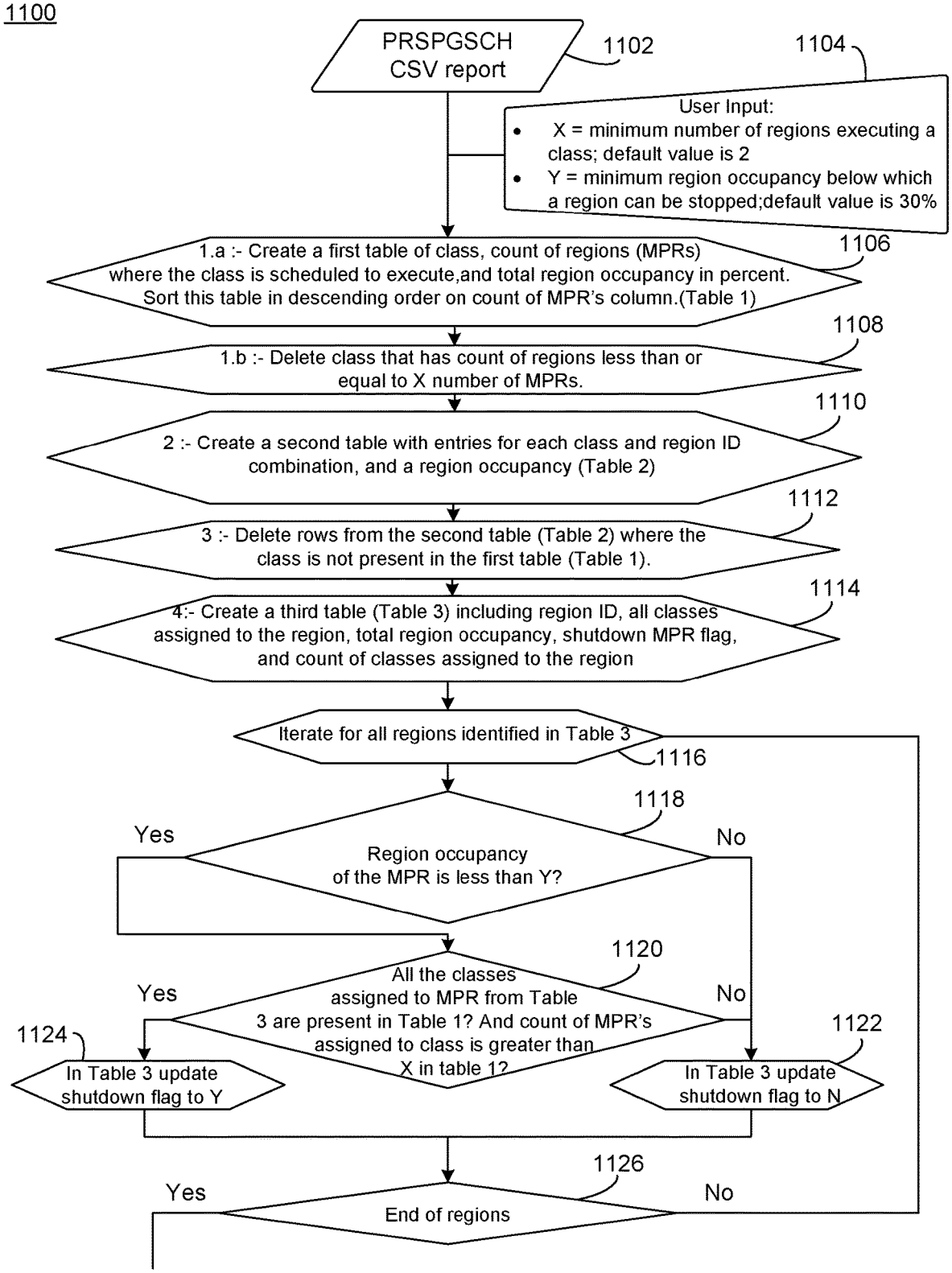
FIGS. 11A and 11B are an example flow diagram of a process for optimizing the number of IMS dependent regions using the system of FIG. 1.
Figure 11B:
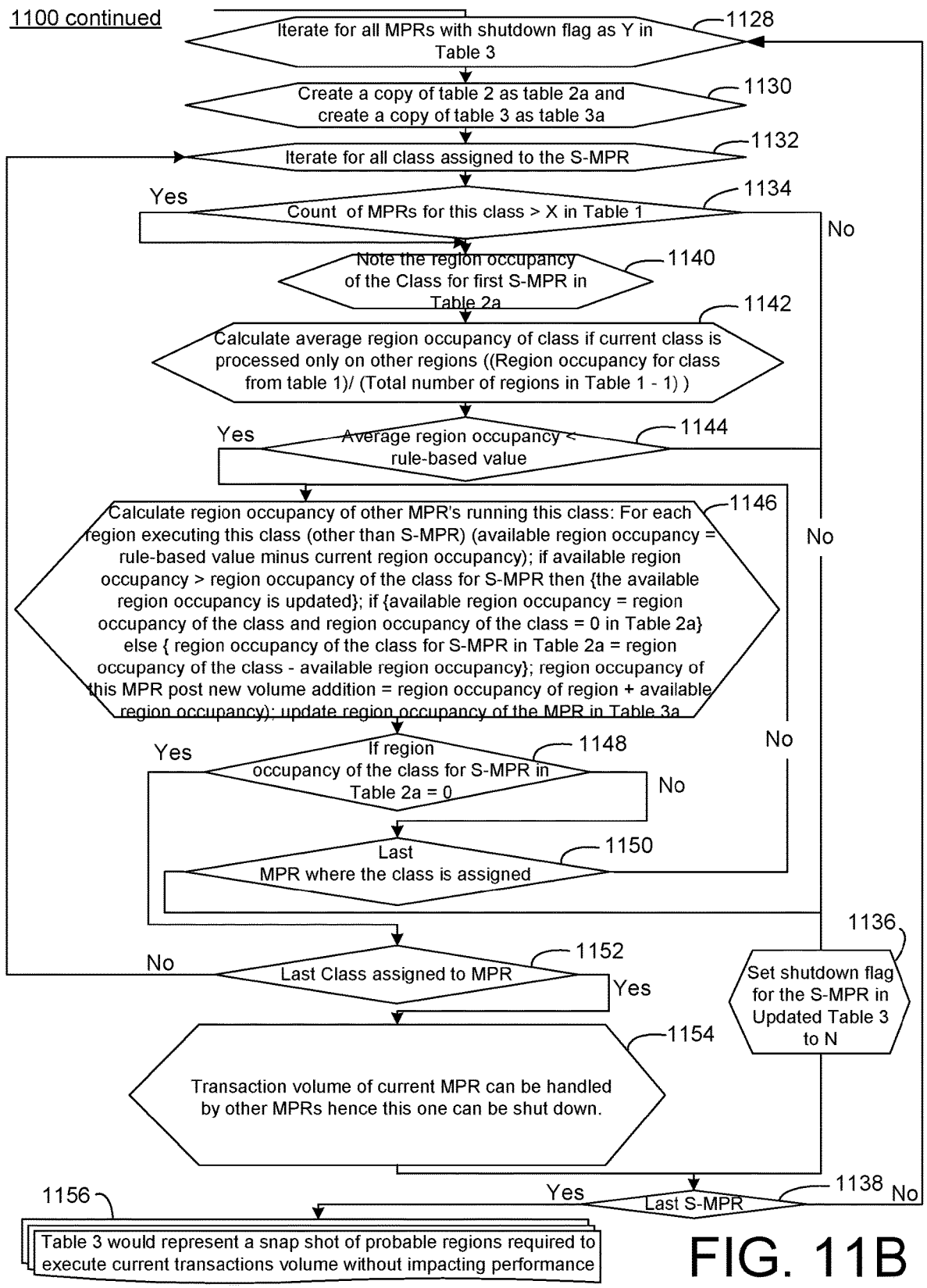

FIGS. 11A and 11B illustrate an example flow diagram of a process 1100 for optimizing the number of IMS dependent regions using the system of FIG. 1. Process 1100 is a computer-implemented method that may be implemented by the IMS TM 102 and its components, including the recommendation engine 126. Instructions and/or executable code for the performance of process 1100 may be stored in the at least one memory 134, and the stored instructions may be executed by the at least one processor 136. Process 1100 is also illustrative of a computer program product that may be implemented by the IMS system 100 of FIG. 1.

Referring to FIG. 11A, the PRSPGSCH CSV report (1102) is used as an input for the process 1100. That is, the recommendation engine 126 may receive a transaction report from a log dataset, where the transaction report is the PRSPGSCH CSV report (1102). As discussed in detail above, an example PRSPGSCH CSV report 300 is illustrated in FIG. 3.

The PRSPGSCH CSV report 300 may be for a particular time frame such that an optimum number of MPRs 118a-118n to allocate is calculated for the particular time frame. In this manner, process 1100 may be run multiple different times using a PRSPGSCH CSV report 300 from different time frames to determine the optimum number of MPRs to allocate for each different time frame. In some implementations, the time frame may be in eight-hour blocks of time such that three different reports of eight hours each covers a single, twenty-four-hour period. In some implementations, the time frame may be in six-hour blocks of time such that four different reports of six hours each covers a single, twenty-four-hour period. In some implementations, the time frame may be in four-hour blocks of time such that six different reports of four hours each covers a single, twenty-four-hour period. It is understood that other time frame blocks may be used other than the examples provided. It is also understood that different start and stop times for the time frame blocks may be used.

Process 1100 may include received user input (1104). The received user input may include a minimum number of regions for executing a class, X, and/or a minimum region occupancy below which a region can be stopped, Y. The system programmer may thus determine the number of regions to which a particular class may be assigned. With respect to the minimum number of regions executing a class, X, a default value is two regions. The IMS TM 102 may validate received values to confirm that the received values are no lower than the default minimum value. That is, the IMS TM 102 recommends that, at a minimum, each class should be executed in at least two MPRs from among MPRs 118a-118n. The IMS TM 102 may validate to confirm that the received values are no lower than the default minimum value. The IMS TM 102 may reject values that are below the minimum default values.

As used herein, region occupancy is a total amount of time in percent that a particular MPR is busy. In some implementations, for the minimum region occupancy below which a region can be stopped, a default value is 30%. When a region falls below the minimum region occupancy, then the region is a potential candidate for being shut down. This value is used to assist in identifying MPRs from among the MPRs 118a-118n that are not too busy and, therefore, may be potential candidates to shut down. For MPRs 118a-118n that have a minimum region occupancy below the received value (or the default value if no value is received), such MPRs are potential candidates for being shut down. For MPRs from among MPRs 118a-118n that have a minimum region occupancy above the received value (or the default value if no value is received), such MPRs are not potential candidates for being shut down. A region that is shut down means that the region is stopped and is not available for receiving and processing transactions. A region that is shut down does not use system resources. In some implementations, the IMS TM 102 may validate to confirm that the received value for the minimum region occupancy has for example, a maximum value of 40%. In such example, the IMS TM 102 may generate and display a warning if a received value is more than 40% minimum region occupancy. The IMS TM 102 may prompt the user to input values for X and Y. If no values are input, process 1100 proceeds by using default minimum values for X and Y.

In the examples discussed below, the received user input for X is 3. Also, in the examples below, the IMS system has a total of 83 MPRs running 15 classes having an average region occupancy of 3.73%.

Process 1100 includes creating a first table (Table 1) that includes class listed by class ID, a count (or number) of regions (MPRs) where the class is scheduled to execute, and a total region occupancy in percent (1106). The first table (Table 1) is a listing of classes and how many regions each class is assigned to. Additionally, the first table (Table 1) lists the total percent region occupancy of the class on the IMS system. In some implementations, the first table (Table 1) may be sorted in descending order on the count of MPRs column.

FIG. 12 illustrates an example first table (Table 1) 1200. The first table (Table 1) 1200 includes a class ID 1202, a count of regions (MPRs) the class is assigned to (#) (1204), and a total region occupancy in percent (%) (1206). For instance, the first table (Table 1) 1200 shows that class ID 218 has 20 regions assigned to it and occupies a total region occupancy on the IMS system of 97.35%.

Process 1100 includes deleting a class that has a count of regions assigned to the class less than or equal to the value X, for the number of MPRs (1108) required to execute the class. The received input value X is used or otherwise the system default value is used if no input was received. In this example, the received value is three. With reference to FIG. 12, process 1100 deletes the rows for class ID 211, 213, 215, and 202, because those class IDs have a count of regions in the class that is equal to or less than three. The classes that are deleted from the first table are removed from consideration for shut down. The first table (Table 1) is updated to reflect the deleted rows.

Process 1100 creates a second table (Table 2) that includes entries for each class and region ID combination, and a region occupancy (1110) of the class for this class and region ID combination. The region occupancy is in terms of a percentage. The second table (Table 2) uses class ID as the index. In some implementations, the second table (Table 2) may be sorted in ascending order of class ID. The second table (Table 2) is a more detailed version of the first table (Table 1), where the second table (Table 2) lists each of the regions by region ID that a class is assigned to. The second table (Table 2) also lists the region occupancy for the class in each region.

FIGS. 13A, 13B, and 13C illustrate an example second table (Table 2) 1300. The second table (Table 2) 1300 includes class ID 1302, a region ID 1304, and a region occupancy of the class for this region in percentage (1306). For example, the class having a class ID 4 is assigned to multiple regions. Specifically, class ID 4 is assigned to regions 1, 16, 25, 26, 39, 45, 54, 68, 77, 79, 89, 96, and 206. For class ID 4 in each of these regions, a region occupancy is also listed (1306). From the first table (Table 1) 1200, the total number of regions for class ID 4 is 13 regions having a total region occupancy of 31.56%. The second table (Table 2) 1300 provides more granularity on each of these 13 regions.

Process 1100 includes deleting rows from the second table (Table 2) 1300 where the class is not present in the first table (Table 1) 1200 (1112). That is, rows in the second table (Table 2) 1300 are deleted where the class was deleted from the first table (Table 1) 1200 because the class did not include more than the minimum number of regions, X. With reference to FIG. 13, process 1100 deletes the rows for class ID 211, 213, 215, and 202 from the second table (Table 2) 1300 because those class IDs have a count of regions in the class that is equal to or below three and were deleted from the first table (Table 1) 1200 (1108). In this manner, only classes that are eligible for further processing remain in the second table (Table 2) 1300.

Process 1100 creates a third table (Table 3) that includes the region ID, all of the classes assigned to the region ID, the total region occupancy, a shutdown MPR flag, and a count of classes assigned to the region (1114). The third table (Table 3) may use the region ID as the index and the other columns may include the classes assigned to the region as listed by class ID, the region occupancy in percentage, the shutdown MPR flag, and the count of classes assigned to the region.

FIGS. 14A, 14B, and 14C illustrate an example third table (Table 3) 1400. The third table (Table 3) 1400 includes the region ID 1402, the classes assigned to the region: class #1 1404, class #2 1406, class #3 1408, and class #4 1410. The third table (Table 3) 1400 also includes the region occupancy in percentage 1412, the shutdown MPR flag 1414, and the count of classes assigned 1416. For instance, in the first row of the third table (Table 3) 1400, region ID 1 is only currently running class 4 having a total region occupancy of 2.49%. A total of one class is assigned to region ID 1. In this example of the third table (Table 3) 1400, many regions are only running 1 class. An example of a region running multiple classes is region ID 67, which is running a total of two classes: class 65 and class 66 having region occupancy of 3.41%.

Process 1100 then iterates for all regions identified in Table 3 (1116). That is, process 1100 iterates through the third table (Table 3) 1400 for each region ID. The iteration starts with the first region ID in the third table (Table 3) 1400. For example, the iteration starts with region ID 1, which is the first row in the third table (Table 3) 1400 in FIG. 14A.

For each region ID, process 1100 determines whether the region occupancy percentage of the MPR is less than the value Y for the minimum region occupancy of MPR that can be shut down (1118). For example, region ID 1 in the third table (Table 3) 1400 has a region occupancy of 2.49%, which is less than the value Y, which is 30%. Thus, region ID 1 is eligible for further processing to determine if region ID 1 is a candidate for being shut down. Specifically, if the region occupancy of the MPR is less than Y (1118), then process 1100 determines whether all the classes assigned to the MPR from the third table (Table 3) 1400 are present in the first table (Table 1) 1200 and whether the count of MPRs assigned to the class is greater than the value X in the first table 1200 (Table 1) (1120).

If the region occupancy of the MPR is greater than Y (1118), then process 1100 updates the shutdown MPR flag to "N" in the third table (Table 3) 1400 (1122). Similarly, if all the classes assigned to the MPR from the third table (Table 3) 1400 are not present in the first table (Table 1) 1200 or if the count of MPRs assigned to the class is less than the value of X (1120), then process 1100 updates the shutdown MPR flag to "N" in the third table (Table 3) 1400 (1122). When the shutdown MPR flag is set to "N", this means that the region is not a candidate for being shut down. That is, the system will not recommend shutting down this region when the shutdown MPR flag is set to "N". If there is any class within the region that does not have more than the minimum number of regions, then that region is not eligible to be shut down. Additionally, for instance, if the region occupancy for a region is greater than 30%, then the process 1100 will not recommend shutting down the region.

For example, with respect to ID region 1 in the third table (Table 3) 1400, the process checks the first class having class ID 4 to see if class ID 4 is present in the first table (Table 1) 1200 and if the count of MPRs assigned to class ID 4 is greater than the value "X" in the first table (Table 1) 1200. In the first table (Table 1) 1200, class ID 4 is present in the first table (Table 1) 1200 and the count of regions assigned to the class ID 4 is 13, which is greater than 3. Thus, class ID 4 and region ID 1 are still eligible for further consideration as a shutdown candidate.

If all the classes assigned to the MPR from the third table (Table 3) 1400 are present in the first table (Table 1) 1200 and if the count of MPRs assigned to the class is greater than the value X in the first table (Table 1) 1200 (1120), then process 1100 updates the shutdown MPR flag to "Y" in the third table (Table 3) 1400 (1124). Process 1100 determines if this is the end of the regions (1126). If this is not the end of the regions (1126), process 1100 returns back to iterating through all of the regions in the third table 1400 (1116). If this is the end of the regions (1126), then process 1100 continues with an iteration for all MPRs with shutdown flag set to "Y" in the third table 1400 (1128).

At the end of the iteration of the process 1116, 1118, 1120, 1122, 1124, and 1126, the third table (Table 3) 1400 will have marked those regions that have classes in more than three MPRs from among MPRs 118a-118n and whose region occupancy is less than 30%. These regions are marked with the shutdown MPR flag set to "Y" and are eligible for shut down. The regions that do not meet both criteria are marked with the MPR flag set to "N" and are not eligible for shutdown.

FIGS. 15A, 15B, and 15C illustrate an updated third table (Updated Table 3) 1400a with the shutdown flags set to "Y" and "N" based on the above steps 1116, 1118, 1120, 1122, 1124, and 1126. As illustrated in the updated third table (Updated Table 3) 1400a, in the Region ID column (1402), rows for regions 27, 32, 40, 44, 59, 84, 93, 104, 222, and 230 have the shutdown MPR flag 1414 set to "N". All of the other regions have the shutdown MPR flag 1414 set to "Y".

Process 1100 continues by identifying the regions having the MPR flag set to "Y" that are the least busy. Process 1100 iterates through each region marked with MPR flag set to "Y" in the updated third table (Updated Table 3) 1400a (1128).

For the MPRs with the shutdown flag set to "Y" in the updated third table (Updated Table 3) 1400a, these MPRs are referred to as a shutdown-eligible MPR (S-MPR hereinafter). Process 1100 creates a copy of the second table 1300 (now referred to as Table 2a) (copy not shown) and creates a copy of the updated third table 1400a (now referred to as Table 3a) (copy not shown) (1130) and then iterates for all classes assigned to the S-MPR (1132). That is, for each region (S-MPR), the process is performed for each class assigned to the region. The copy of second table 1300 (Table 2a) (not shown) and the copy of the updated third table 1400a (Table 3a) (not shown) are used as working copies as the process iterates through each S-MPR.

For example, the Region ID 67 in updated third table 1400a includes two classes: class 65 and class 66. One iteration is performed for class 65 and one iteration is performed for class 66. For each class, process 1100 determines whether the count of MPRs for this class is greater than the value "X" in Table 1 (1134), the first table 1200. If the count of MPRs for this class is not greater than the value "X" from the first table (Table 1) 1200 (1134), then the shutdown flag for the S-MPR in the Updated Table 3 1400a is set to "N" (1136) and the process continues to the next S-MPR (1138). If the count of MPRs for this class is greater than the value "X" in Table 1 1200 (1134), then the region occupancy of the class for this first S-MPR is noted in Table 2a 1300 (1140).

In the example of the Region ID 67 and from FIG. 12, class 65 is assigned to 19 MPRs, which is greater than the value of "X" (3), and the total region occupancy for class 65 is 49.54%, as can be seen from the first table (Table 1) 1200 (1134); hence, the process continues by noting in Table 2a 1300 the region occupancy for class 65 in S-MPR 67, which is 1.01% (1140). From FIG. 12, class 66 is assigned to 7 MPRs, which is greater than the value of "X" (3), and the total region occupancy for class 66 is 24.17%, as can be seen from the first table (Table 1) 1200 (1134); hence, the process continues by noting in Table 2a 1300 the region occupancy for class 66 in S-MPR 67, which is 2.39% (1140).

Process 1100 calculates the average region occupancy of the class if the current class is processed only on other regions (1142). This is done to determine the impact of shutting down a region on the remaining regions. The average region occupancy is equal to the region occupancy for the class from Table 1 1200 divided by total number of regions in Table 1 1200 minus 1. For example, the average region occupancy for class 65 is equal to (49.54/18) =2.752%. The average region occupancy for class 66 is equal to (24.17/6)=4.028%.

Process 1100 determines if the average region occupancy is less than a rule-based value (1144) (e.g., 55%). If the average region occupancy is not less than the rule-based value (1144) (e.g., 55%), then the shutdown flag for the S-MPR in the updated Table 3 is set to "N" (1136), and the process continues to the next S-MPR (1138). This is done because a region occupancy greater than 55% would have a workload that is too high for the region. This rule-based value may be updated from a rule set based on performance of the process 1100. If the average region occupancy is less than the rule-based value (1144) (e.g., 55%), then the region occupancy of other MPRs running this class is calculated (1146). The details of the calculation of Step 1146 are provided below. In some implementations, the rule-based value may be configurable and set by a user such as a system administrator. In some implementations, a default rule-based value may be used.

For the iterations of steps 1132, 1134, 1140, 1142, and 1144, if any of the regions fails the criteria tests discussed above, then the region is no longer a candidate for shutdown.

With respect to class 65, the average region occupancy of 2.752 is less than the rule-based value of 55%. With respect to class 66, the average region occupancy of 4.028% is less than the rule-based value of 55%. Thus, for both class 65 and class 66, process 1100 continues to calculate the region occupancy of other MPRs running each class (1146).

FIG. 16 illustrates a snippet 1600 of the second table (Snippet of Table 2) 1600 for class 65 and class 66. The region occupancy of other MPRs running this class is calculated (1146). First, the process calculates the impact on the region occupancy of this region if S-MPR is shut down. The available region occupancy of current MPRs if S-MPR is shut down is equal to the rule-based value (e.g., 55%)

minus region occupancy of the current MPR. For class 65, the available region occupancy for Region ID 13=(55%–3.75%)=51.25%. For class 66, the available region occupancy for Region ID 150=(55%-4.68%)=50.32%. If the available region occupancy is greater than the region occupancy of the class for the S-MPR, then the available region occupancy is updated. The available region occupancy is equal to the region occupancy of the class and region occupancy of the class=0 in Table 2a the second table (Snippet of Table 2) 1600. Else, the region occupancy of the class for S-MPR in the (Snippet of Table 2) 1600 equals the region occupancy of the class minus the available region occupancy and the region occupancy of this MPR post the new volume addition equals the region occupancy of the region plus the available region occupancy. The region occupancy of the MPR is updated in the third table 1400a.

For example:

---

If (51.25% > 1.01%)
Then
{Available region occupancy of REGION ID 13 = 3.75 and update Region occupancy of Class 65 for Region ID 67 = 0 in the second table (Table 2 1300))
Else
{update
Region occupancy of the class 65 for the MPR ID 67 (in the second table (Table 2 1300)) = Region Occupancy of Class in Region 67 (1.01%) - Available region occupancy in MPR 13 (51.25%)
}
If (50.32% > 2.39%)
Then
{Available region occupancy of REGION ID 150 = 2.97% and update Region occupancy of Class 66 for Region ID 67 = 0 in Updated Snippet of
Table 2 1700 in FIG. 17)
Else
{update
Region occupancy of the class 66 for the MPR ID 67 (in second table (Table 2 1300)) = Region Occupancy of Class in Region 67 (2.39%) - Available region occupancy in MPR 13 (50.32%)
}.

---

Then, the process adds available region occupancy to current Class and MPR combination in the second table (Table 2 1300).

Region Occupancy of Class 65 in MPR 13=3.75+1.01=4.76

Region Occupancy of Class 66 in MPR 150=2.97+2.39=5.36

FIG. 17 illustrates an updated snippet 1700 of the second table (Updated Snippet of Table 2) for class 65 and 66.

The region occupancy of the current MPR post the new volume addition is equal to the region occupancy of the current MPR plus the available region occupancy.

Region Occupancy of MPR 13=3.75+1.01=4.76

Region Occupancy of MPR 150=4.68+2.39=7.07

Figure 18C:

Then, the third table is updated, Updated Table 3 (1800) with the calculated region occupancy for the current MPR. FIGS. 18A, 18B, and 18C illustrate an updated third table (Updated Table 3)1800.

Process 1100 determines whether the region occupancy of the class for S-MPR in Table 2a equals 0 (1148). If the region occupancy of the class for S-MPR in the second table is not equal to 0 (1148), then process 1100 determines whether this is the last MPR where the class is assigned (1150). If not, then the process goes back to step 1146. If yes, then the process goes to step 1136 and sets the shutdown flag for the MPR in Updated Table 3 to "N".

If the region occupancy of the class for the S-MPR in the second table 1300 (Table 2) is equal to 0 (1148), then process 1100 determines if this is the last class assigned to the MPR (1152). If no, then process 1100 returns to iterate for all classes assigned to the S-MPR (1132). If yes, then process 1100 determines that the transaction volume of the current MPR can be handled by other MPRs and hence this one can be shut down (1154). The region occupancy of the S-MPR is updated as 55% in the third table (Table 3). The third table (Table 3) is replaced by the updated third table 1800 (Updated Table 3). The count of regions in the first table 1200 (Table 1) is reduced by 1 for each class assigned to this S-MPR. FIG. 19 illustrates an updated first table (Updated Table 1) 1900. The second table 1300 (Table 2) is replaced by the (Updated Table 2) table. If this is the last MPR (1138), then updated third table 1800 (Updated Table 3) would represent a snapshot of probable regions needed to execute the current transactions volume without impacting performance (1156).

Figure 20:
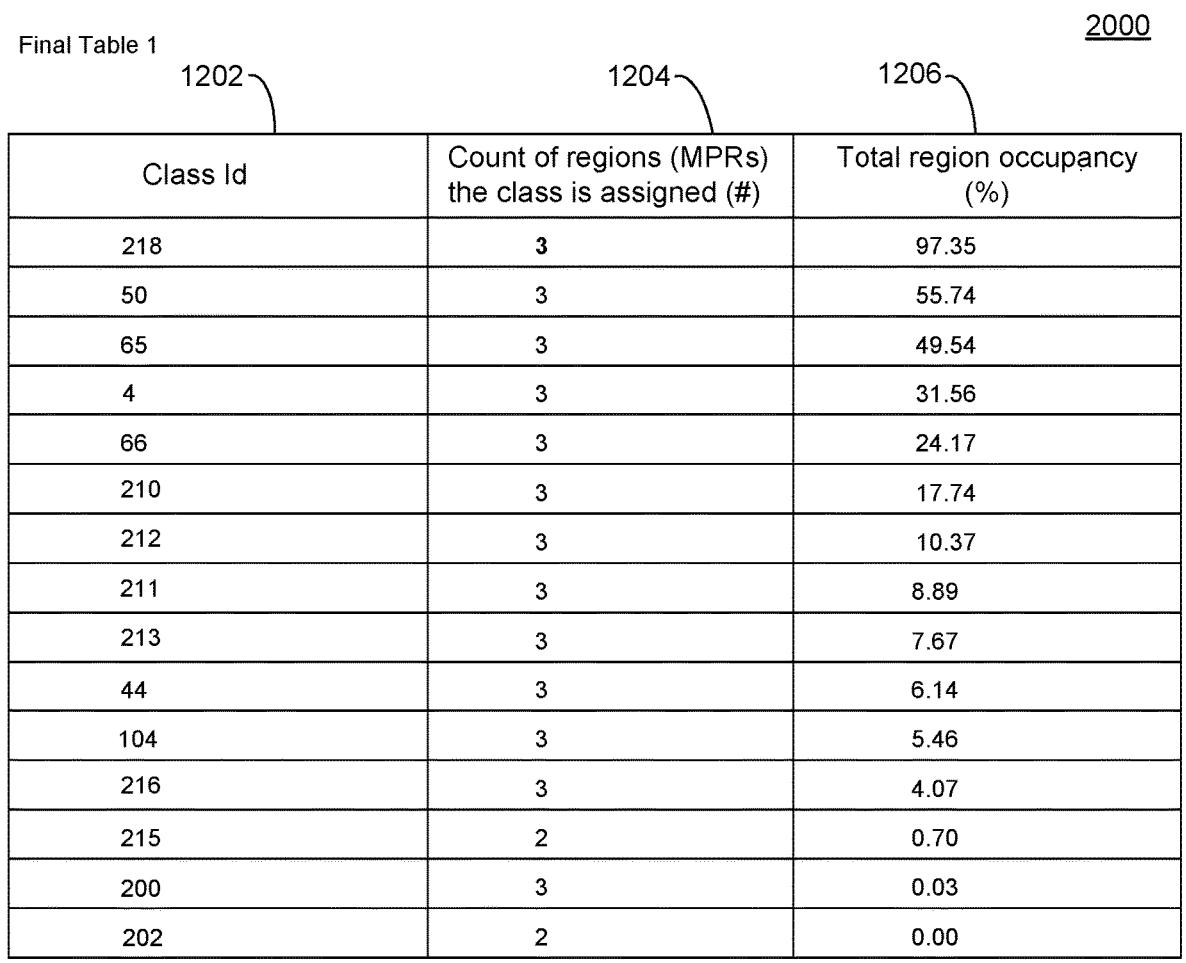
FIG. 20 illustrates a final first table (Final Table 1) created by the process illustrated in FIGS. 11A and 11B.

FIG. 20 illustrates a final first table (Final Table 1) 2000. FIG. 21 illustrates a final second table (Final Table 2) 2100. FIGS. 22A, 22B, and 22C illustrate a final third table (Final Table 3) 2300.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for determining an optimal number of regions in an information management system (IMS system), the computer-implemented method comprising:
   receiving, by a recommendation engine of the IMS system, a transaction report from a log dataset;
   generating, by the recommendation engine, a first table from the transaction report, wherein the first table includes a class identified by a class identifier (ID), a number of regions the class is assigned, and a total percent region occupancy by the class;
   identifying, by the recommendation engine, classes ineligible to be shut down based on a set of criteria and eliminating the classes ineligible to be shut down; and
   for each remaining class assigned to a threshold number of regions:
      identifying, by the recommendation engine, candidate regions from the threshold number of regions eligible for shut down, and
      identifying, by the recommendation engine, remaining regions from the threshold number of regions that can handle a workload from the candidate regions eligible for shut down, wherein the remaining regions represent the optimal number of regions in the IMS system.

2. The computer-implemented method as in claim 1, wherein:
   the log dataset and the transaction report are associated with a time period; and
   the remaining regions represent the optimal number of regions in the IMS system for the time period.

3. The computer-implemented method as in claim 2, wherein the time period includes a four hour period of time.

4. The computer-implemented method as in claim 2, wherein the time period includes a six hour period of time.

5. The computer-implemented method as in claim 2, wherein the time period includes an eight hour period of time.

6. The computer-implemented method as in claim 1, wherein the set of criteria includes a minimum number of regions the class is assigned and a maximum total percent region occupancy by the class.

7. The computer-implemented method as in claim 1, wherein identifying the candidate regions from the threshold number of regions eligible for shutdown includes identifying the regions that have a class that is present in at least two regions and where the class occupies less than a threshold percentage of region occupancy.

8. A computer program product for determining an optimal number of regions in an information management system (IMS system), the computer program product being tangibly embodied on a non-transitory computer-readable medium and including executable code that, when executed, is configured to cause a computing device to implement a recommendation engine of the IMS system that is configured to:
   receive a transaction report from a log dataset;
   generate a first table from the transaction report, wherein the first table includes a class identified by a class identifier (ID), a number of regions the class is assigned, and a total percent region occupancy by the class;
   identify classes ineligible to be shut down based on a set of criteria and eliminate the classes ineligible to be shut down; and
   for each remaining class assigned to a threshold number of regions:
      identify candidate regions from the threshold number of regions eligible for shutdown, and
      identify remaining regions from the threshold number of regions that can handle a workload from the candidate regions eligible for shutdown, wherein the remaining regions represent the optimal number of regions in the IMS system.

9. The computer program product of claim 8, wherein:
   the log dataset and the transaction report are associated with a time period; and
   the remaining regions represent the optimal number of regions in the IMS system for the time period.

10. The computer program product of claim 9, wherein the time period includes a four hour period of time.

11. The computer program product of claim 9, wherein the time period includes a six hour period of time.

12. The computer program product of claim 9, wherein the time period includes an eight hour period of time.

13. The computer program product of claim 8, wherein the set of criteria includes a minimum number of regions the class is assigned and a maximum total percent region occupancy by the class.

14. The computer program product of claim 8, wherein the executable code that, when executed, causes the computing device to identify the regions that have a class that is present in at least two regions and where the class occupies less than a threshold percentage of region occupancy.

15. A system for determining an optimal number of regions in an information management system (IMS system), comprising:
   at least one processor; and a non-transitory computer readable medium comprising instructions that, when executed by the at least one processor, cause the system to implement a recommendation engine of the IMS system that is configured to:
receive a transaction report from a log dataset;
generate a first table from the transaction report, wherein the first table includes a class identified by a class identifier (ID), a number of regions the class is assigned, and a total percent region occupancy by the class;
identify classes ineligible to be shut down based on a set of criteria and eliminate the classes ineligible to be shut down; and
for each remaining class assigned to a threshold number of regions:
  identify candidate regions from the threshold number of regions eligible for shutdown, and
  identify remaining regions from the threshold number of regions that can handle a workload from the candidate regions eligible for shutdown, wherein the remaining regions represent the optimal number of regions in the IMS system.

16. The system of claim 15, wherein:
the log dataset and the transaction report are associated with a time period; and
the remaining regions represent the optimal number of regions in the IMS system for the time period.

17. The system of claim 16, wherein the time period includes a four hour period of time.

18. The system of claim 16, wherein the time period includes a six hour period of time.

19. The system of claim 16, wherein the time period includes an eight hour period of time.

20. The system of claim 15, wherein the set of criteria includes a minimum number of regions the class is assigned and a maximum total percent region occupancy by the class.

21. The system of claim 15, wherein the instructions that, when executed, causes the at least one processor to identify the regions that have a class that is present in at least two regions and where the class occupies less than a threshold percentage of region occupancy.

* * * * *